United States Patent
Daniels

(10) Patent No.: US 10,525,766 B2
(45) Date of Patent: Jan. 7, 2020

(54) WHEEL WITH ADJUSTABLE RADIUS AND TREAD FIRMNESS

(71) Applicant: Keir P. Daniels, New York, NY (US)

(72) Inventor: Keir P. Daniels, New York, NY (US)

( * ) Notice: Subject to any disclaimer, the term of this patent is extended or adjusted under 35 U.S.C. 154(b) by 203 days.

(21) Appl. No.: 15/712,721

(22) Filed: Sep. 22, 2017

(65) Prior Publication Data

US 2019/0092091 A1    Mar. 28, 2019

(51) Int. Cl.
*B60B 9/28* (2006.01)
*B60B 19/04* (2006.01)

(52) U.S. Cl.
CPC ............... *B60B 9/28* (2013.01); *B60B 19/04* (2013.01); *B60G 2204/30* (2013.01)

(58) Field of Classification Search
CPC .... B60B 9/00; B60B 9/02; B60B 9/06; B60B 9/26; B60B 9/28; B60C 7/10; B60C 7/14; B60C 7/16; B60C 7/18
See application file for complete search history.

(56) References Cited

U.S. PATENT DOCUMENTS

| | | |
|---|---|---|
| 913,066 A | 2/1909 | Soss |
| 1,015,864 A | 1/1912 | Williams |
| 1,145,775 A | 7/1915 | Lavery |
| 1,323,235 A | 11/1919 | Hobson |
| 1,751,929 A | 3/1930 | Laroze |
| 1,946,787 A | 2/1934 | Feinberg et al. |
| 3,179,431 A | 4/1965 | Pikl |
| 3,802,743 A | 4/1974 | Hermanns |
| 4,046,339 A | 9/1977 | Stancliffe |
| 4,108,231 A | 8/1978 | Holchuk |
| 4,420,192 A | 12/1983 | Holchuk |
| 4,602,823 A | 7/1986 | Berg |
| 4,917,162 A | 4/1990 | De Longcamp |
| 5,487,692 A | 1/1996 | Mowrer et al. |
| 5,492,390 A | 2/1996 | Kugelmann |
| 5,690,375 A | 11/1997 | Schneider |
| 5,839,795 A | 11/1998 | Matsuda et al. |
| 6,041,838 A | 3/2000 | Al-Sabah |
| 6,164,736 A | 12/2000 | Warner |
| 6,264,283 B1 | 7/2001 | Rehkemper et al. |

(Continued)

FOREIGN PATENT DOCUMENTS

| | | |
|---|---|---|
| CN | 201362133 | 12/2009 |
| CN | 204605396 | 9/2015 |

(Continued)

*Primary Examiner* — Jason R Bellinger
(74) *Attorney, Agent, or Firm* — Jones Walker LLP

(57) ABSTRACT

A wheel with adjustable radius or tread firmness including a hub assembly, primary spokes, a suspension assembly positioned at the outer end of each primary spoke, and treads attached to the outer end of each suspension assembly. The hub assembly includes a radius lock and a tensioner lock. When each is in a locked position, the radius and tread firmness of the wheel remains constant. When the radius lock or the tensioner lock is in an unlocked position, the radius or the tread firmness, respectively, is adjusted by rotating the wheel relative to internal components of the hub assembly. This relative rotation adjusts the tension on internal cords to adjust the length of the primary spokes or flexibility of the suspension assemblies, respectively. Optionally, secondary spokes may be positioned between each of the primary spokes and the suspension assemblies. The radius and tread firmness is adjustable under a load.

21 Claims, 16 Drawing Sheets

(56) References Cited

U.S. PATENT DOCUMENTS

| | | |
|---|---|---|
| 6,698,480 B1 | 3/2004 | Cornellier |
| 6,725,895 B1 | 4/2004 | Tsipov |
| 6,860,346 B2 | 3/2005 | Burt et al. |
| 7,044,179 B2 | 5/2006 | Tashiro et al. |
| 7,389,999 B2 | 6/2008 | Kimura et al. |
| 7,810,533 B2 | 10/2010 | Wichern |
| 8,011,736 B2 | 9/2011 | Tan |
| 8,091,596 B2 | 1/2012 | Louden |
| 8,127,819 B2 | 3/2012 | Tillement et al. |
| 8,215,672 B2 | 7/2012 | Inuzuka |
| 8,371,659 B2 | 2/2013 | Fitzsimons |
| 8,631,844 B2 | 1/2014 | Anderfaas et al. |
| 8,640,752 B2 | 2/2014 | Kouno |
| 8,678,520 B2 | 3/2014 | Sheu et al. |
| 8,833,864 B2 | 9/2014 | Solheim et al. |
| 8,863,794 B2 | 10/2014 | Wichern |
| 9,180,733 B2 | 11/2015 | Sgherri |
| 9,266,388 B2 | 2/2016 | Schaedler et al. |
| 9,381,442 B2 | 7/2016 | Barse |
| 9,415,631 B2 | 8/2016 | Lee et al. |
| 9,445,960 B2 | 9/2016 | Abughaida |
| 9,527,344 B1 | 12/2016 | Donohue |
| 9,539,876 B2 | 1/2017 | Winshtein et al. |
| 2005/0022913 A1 | 2/2005 | Chan |
| 2006/0197305 A1 | 9/2006 | Wichern |
| 2009/0152937 A1 | 6/2009 | Wichern |
| 2009/0211675 A1 | 8/2009 | Louden |
| 2009/0294000 A1 | 12/2009 | Cron |
| 2010/0072807 A1 | 3/2010 | Wichem |
| 2010/0201098 A1 | 8/2010 | Fitzsimons |
| 2011/0025118 A1 | 2/2011 | Kouno |
| 2011/0030861 A1 | 2/2011 | Wichern |
| 2011/0080028 A1 | 4/2011 | Erb et al. |
| 2011/0080038 A1 | 4/2011 | Tan |
| 2011/0272254 A1 | 11/2011 | Anderfaas et al. |
| 2012/0032497 A1 | 2/2012 | Sheu et al. |
| 2012/0104834 A1 | 5/2012 | Sgherri et al. |
| 2013/0167991 A1 | 7/2013 | Donohue |
| 2014/0034198 A1 | 2/2014 | Wichern |
| 2014/0060715 A1 | 3/2014 | Winshtein et al. |
| 2014/0083581 A1 | 3/2014 | Schaedler et al. |
| 2014/0110024 A1 | 4/2014 | Anderfaas et al. |
| 2014/0117637 A1 | 5/2014 | Solheim et al. |
| 2014/0158439 A1 | 6/2014 | Kim et al. |
| 2014/0265536 A1 | 9/2014 | Hein |
| 2014/0332128 A1 | 11/2014 | Solheim et al. |
| 2015/0061353 A1 | 3/2015 | Sheu |
| 2015/0084398 A1 | 3/2015 | Lee |
| 2015/0216748 A1 | 8/2015 | Abughaida |
| 2015/0352896 A1 | 12/2015 | Lee et al. |
| 2016/0068016 A1 | 3/2016 | Winshtein et al. |
| 2016/0075176 A1 | 3/2016 | Solheim et al. |
| 2016/0193877 A1 | 7/2016 | Jang et al. |
| 2016/0303901 A1 | 10/2016 | Kim et al. |
| 2017/0087932 A1 | 3/2017 | Winshtein et al. |
| 2017/0120672 A1 | 5/2017 | Hurd |

FOREIGN PATENT DOCUMENTS

| | | |
|---|---|---|
| CN | 105644266 | 6/2016 |
| DE | 102012000316 | 4/2013 |
| GB | 15462 | 9/1911 |
| GB | 213516 | 4/1924 |
| GB | 561374 | 5/1944 |
| GB | 907455 | 10/1962 |
| KR | 100931217 | 12/2009 |
| KR | 20170083854 | 7/2017 |
| SU | 929467 | 5/1982 |

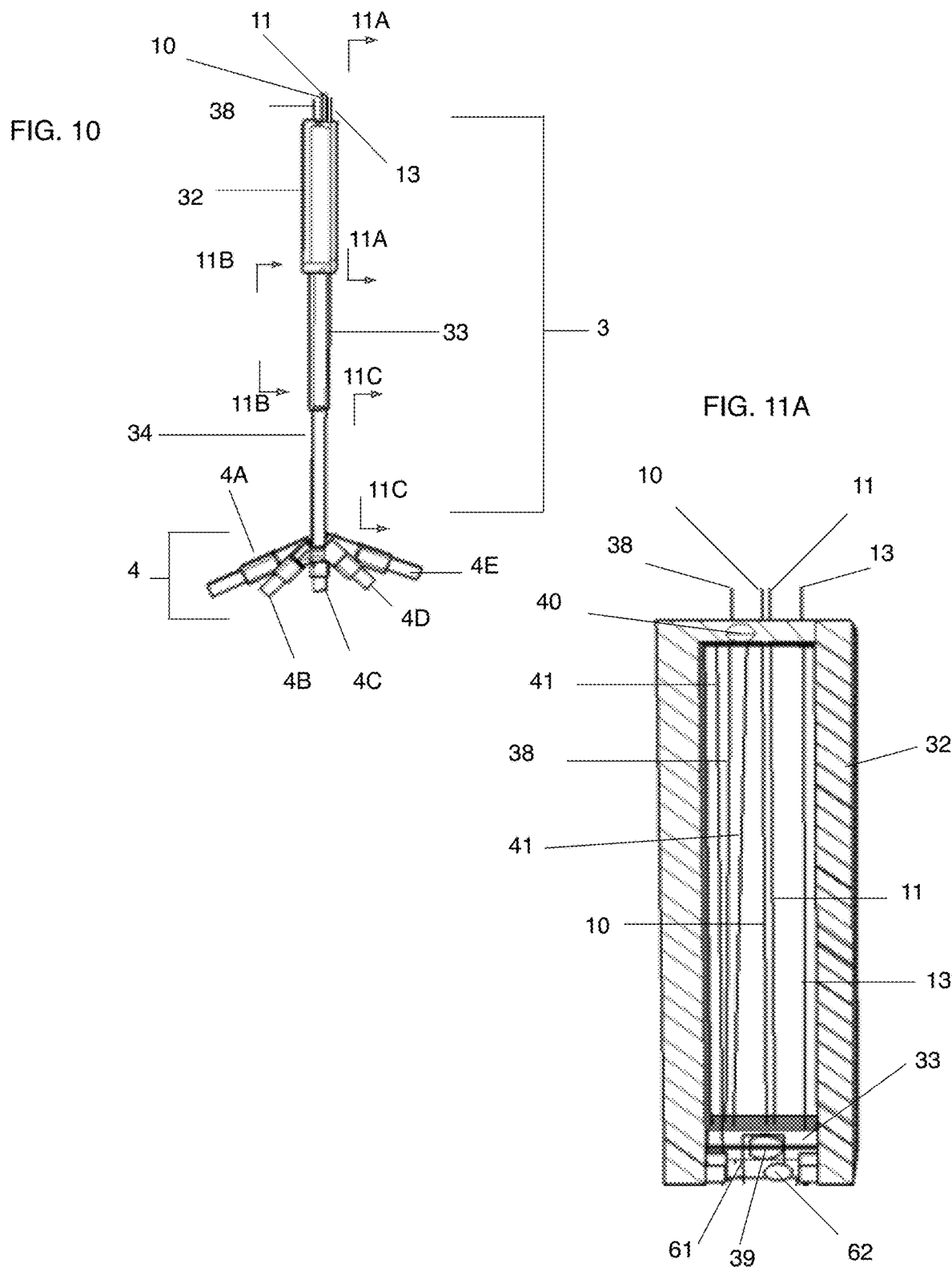

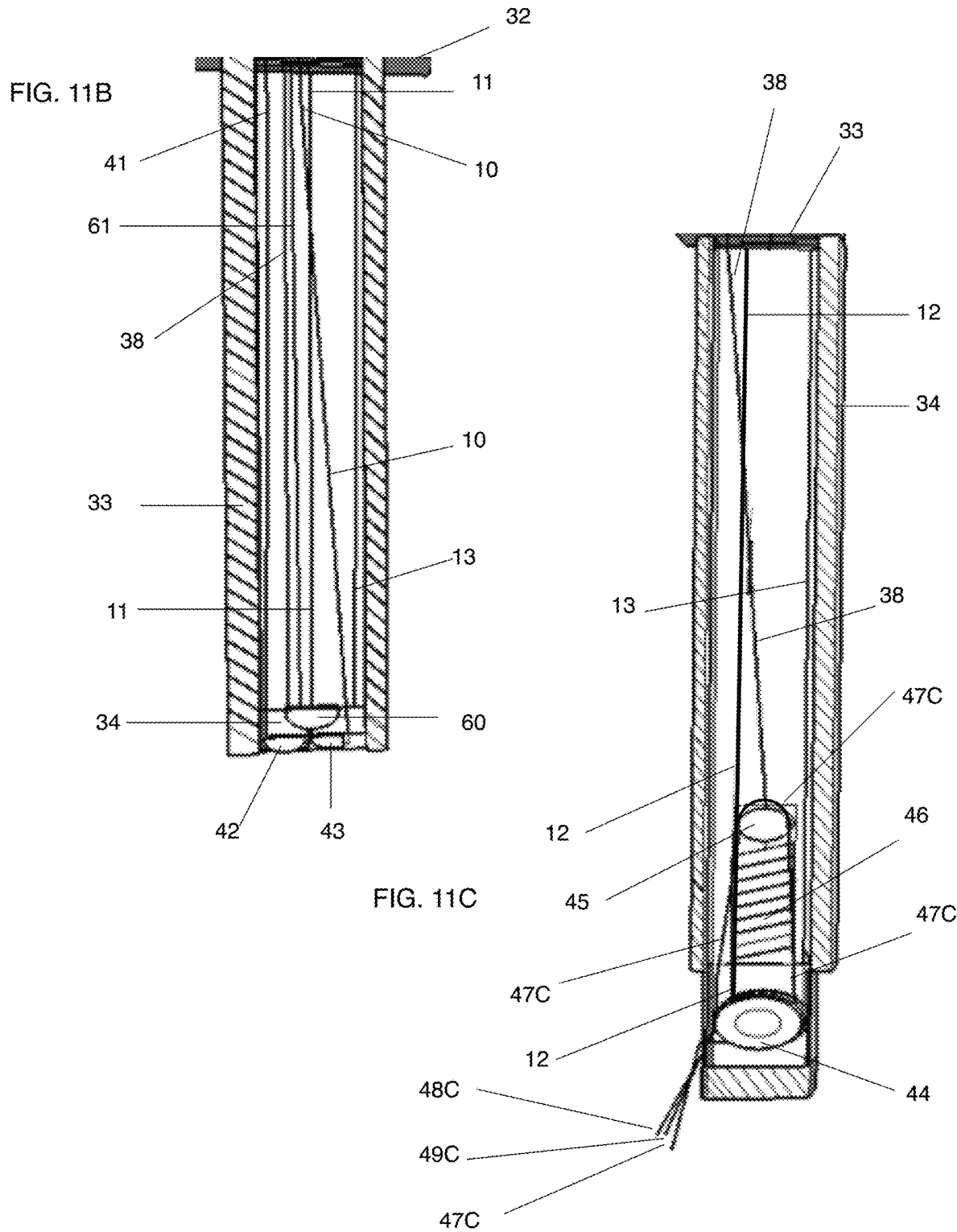

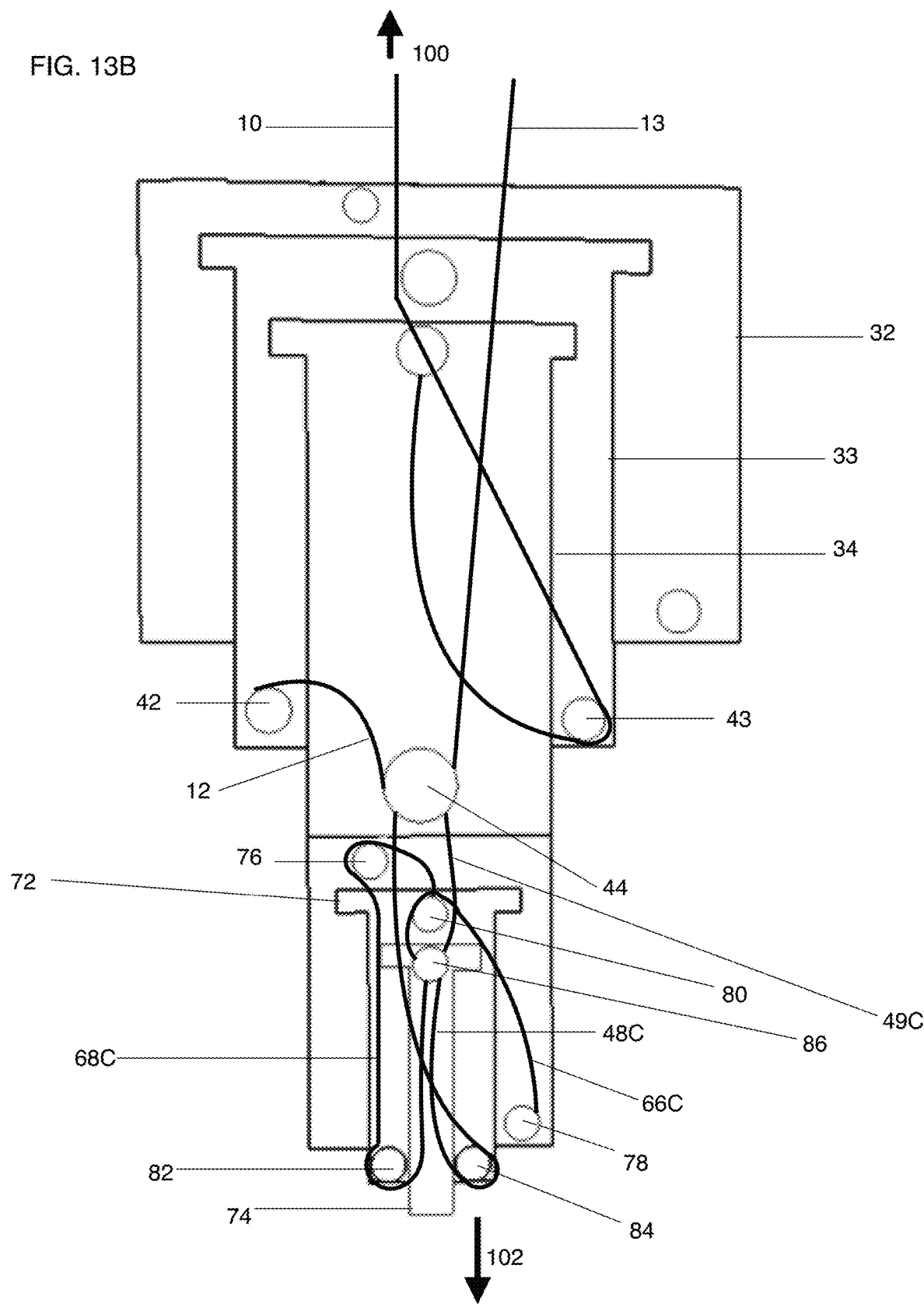

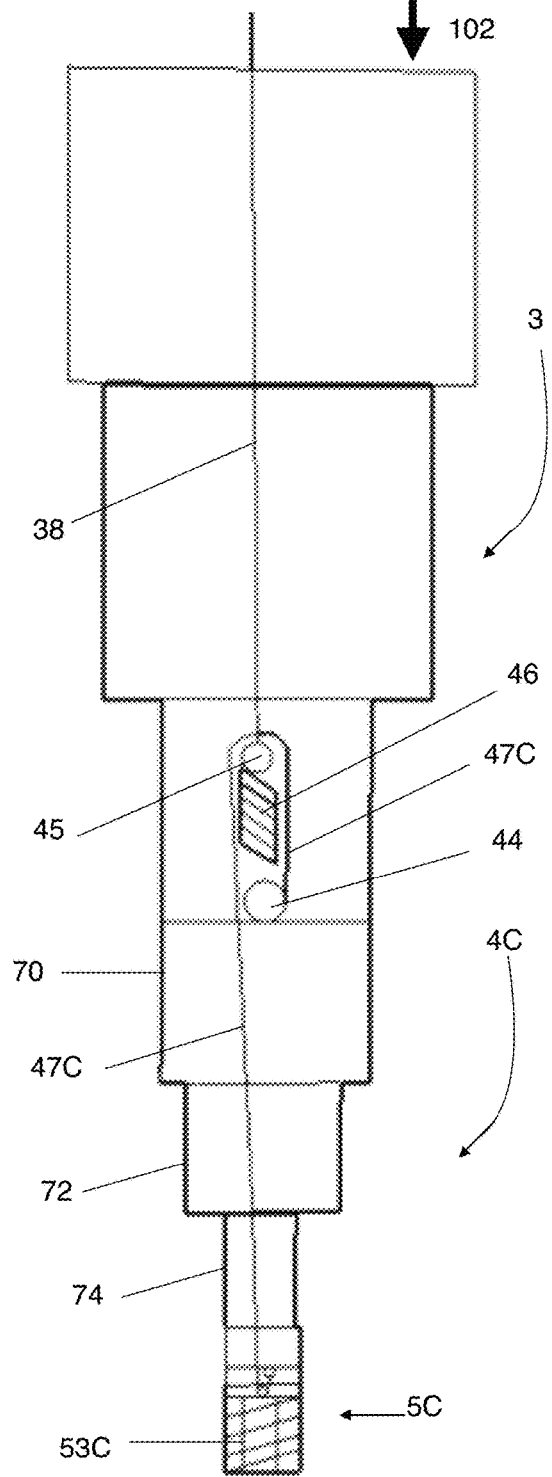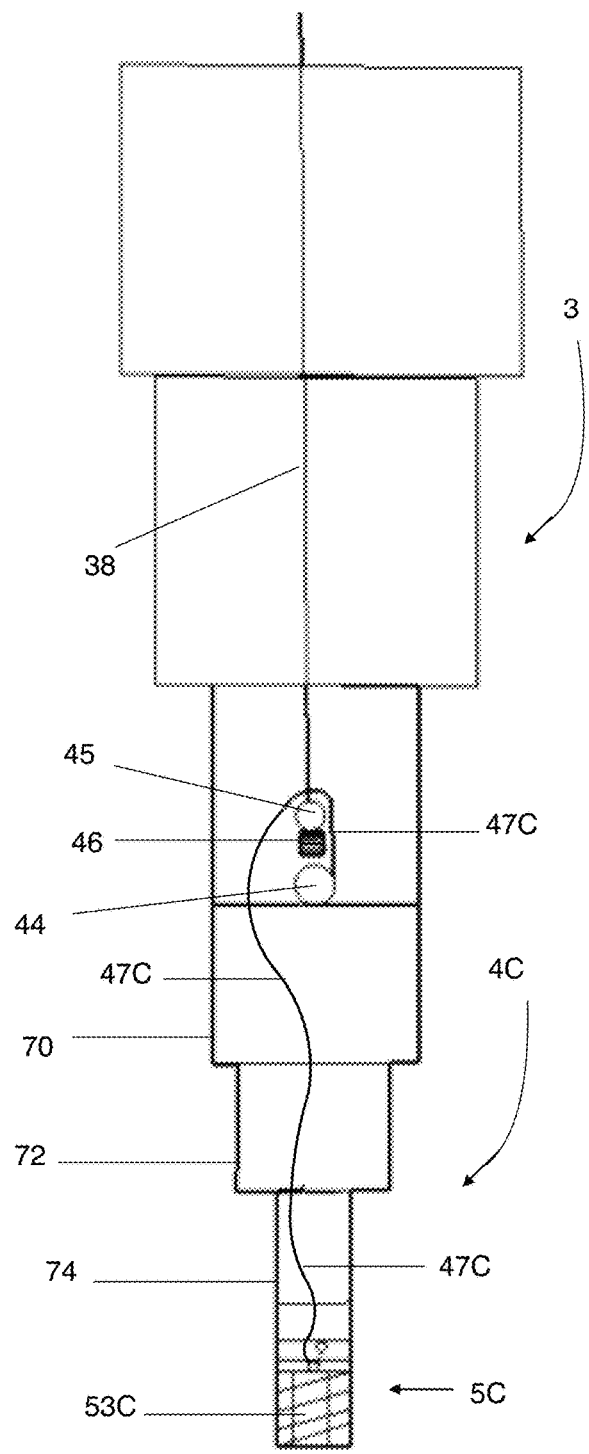

WHEEL WITH ADJUSTABLE RADIUS AND TREAD FIRMNESS

BACKGROUND

Various wheels offer some flexibility to change their diameter and an ability to have a flexible tread without air, but they do not offer variable options that can be set by the user while the wheel is in use under a load. The wheels designed with adjustable diameters are made to facilitate the changing of the tire or to help with tire storage.

SUMMARY OF SELECT EMBODIMENTS

An adjustable wheel includes a central hub assembly, primary spokes, suspension assemblies, and treads. The central hub assembly is the component that attaches to a carriage that uses wheels for motion. The central hub assembly allows a user to control the wheel's radius or the wheel's tread firmness (i.e., the flexibility of the suspension assemblies) while the wheel is under a load. The central hub assembly includes concentrically positioned inner wheel components (including a radius wheel and a tensioner wheel) that spin together with the spinning motion of the wheel when a radius lock and a tensioner lock are both in a locked position.

When the radius lock is in an unlocked position and a brake is applied to the inner-most component of the central hub assembly, the radius wheel remains stationary with the inner-most component instead of rotating with the spinning motion of the wheel. The relative rotation between the radius wheel within the central hub assembly and the primary spokes applies tension to a radius cord system in a manner that (depending upon the direction of the rotation) expands or contracts telescopically sliding segments of each of the primary spokes. When the tensioner lock is in an unlocked position and a brake is applied to the inner-most component of the central hub assembly, the tensioner wheel remains stationary with the inner-most component instead of rotating with the spinning motion of the wheel. The relative rotation between the tensioner wheel within the central hub assembly and the primary spokes (depending upon the direction of the rotation) increases or decreases a tension applied to a firmness cord system to increase or decrease the firmness or flexibility of the suspension assemblies. After adjustment, transferring the radius lock or tensioner lock into the locked position effectively locks the new radius setting or tread firmness setting.

The outer components of the wheel may spin due to the movement of the carriage to which the wheel is mounted. Alternatively, a motor or a foot pedal may be used to spin the outer components of the wheel when the radius lock or the tensioner lock is in the unlocked position. In another embodiment, a break may be applied to the outer-most components of the hub assembly, and a motor or a foot pedal may be used to spin the inner component of the wheel when the radius lock or the tensioner lock is in the unlocked position. The user may remotely lock and unlock the radius lock and the tensioner lock.

The primary spokes are connected directly to the hub. Optionally, secondary spokes may be connected to the outer end of each of the primary spokes. The primary and secondary spokes have the same design but different dimensions. Each spoke includes telescopic segments that include inner pulley systems to extend or contract the spoke length as the tension on the radius cord system changes. The radius cord system includes an expansion cord and a contraction cord. Applying tension to the expansion cord extends the spoke length. Applying tension to the contraction cord contracts the spoke length. If secondary spokes are included, the primary spoke includes a secondary wheel to transfer the relative rotation from the central hub assembly to adjust the radius setting or the tread firmness setting. A first cord extends from the central hub assembly to the secondary wheel, and a second cord extends from within the primary spoke to the secondary wheel. Applying tension to the first cord rotates the secondary wheel in a first direction to contract the telescopic segments of the secondary spoke. The expansion of the primary spoke applies tension to the second cord to rotate the secondary wheel in a second direction, which extends the telescopic segments of the secondary spoke.

The tread firmness is also controlled with a system of pulleys and cords. The suspension assemblies are positioned between the spokes and the treads. Each suspension assembly includes a suspension spring and a suspension pulley. A tension cord set extending from the central hub assembly engages the suspension pulley. Applying tension to the tension cord set with relative rotation in the central hub assembly increases the tread firmness. Releasing tension from the tension cord set with relative rotation in the central hub assembly decreases the tread firmness (increases the tread flexibility and the flexibility of the suspension assemblies). In lower tread firmness settings, the suspension assemblies are able to compress as the wheel rolls over an uneven surface.

The treads are attached to the outer ends of the suspension assemblies. Each tread can be rubber pads, netting or any other suitable material that increases traction while reducing noise. Tread fillers may also be secured between adjacent treads to prevent foreign material from being wedged between the treads.

BRIEF DESCRIPTION OF THE DRAWINGS

FIG. 10 is a front view of a primary spoke and attached secondary spokes.

FIG. 11A is a partial sectional view of a first segment of the primary spoke taken along line 11A-11A in FIG. 10.

FIG. 11B is a partial sectional view of a second segment of the primary spoke taken along line 11B-11B in FIG. 10.

FIG. 11C is a partial sectional view of a third segment of the primary spoke taken along the line of 11C-11C in FIG. 10.

FIG. 13B a schematic view of the secondary spoke components of the radius cord system, with the secondary spoke in the contracted position.

FIG. 16A is a schematic view of the tension cords in the primary spoke and the secondary spoke, with a suspension assembly in a locked position.

FIG. 16B is a schematic view of the tension cords in the primary spoke and the secondary spoke, with the suspension assembly in a flexible position.

DETAILED DESCRIPTION OF THE PREFERRED EMBODIMENTS

An adjustable wheel disclosed herein may be mounted for use on any vehicle, automobile, wagon, stroller, plane, earth or celestial rover, cart, assistant walker, wheel chair, stretcher, hospital bed, rickshaw, and any other body that utilizes a wheel for motion. The adjustable wheel is configured to allow a user to adjust the radius of the wheel and the tread firmness for increased maneuverability in a range of environments while under a load.

For example, the adjustable wheel may be mounted on baby stroller. If a parent is interested in jogging, wheels each having a large radius and stiff treads are used. The parent may need to maneuver the same stroller down a set of stairs, requiring wheels each having a large radius but flexible tread to provide greater shock absorption in the process. The parent may also use the same stroller while shopping in a store, in which wheels each having a smaller radius would improve maneuverability in smaller spaces. The parent may adjust the radius or tread firmness of each wheel while the wheels are under a load (e.g., the load of the stroller with or without a child).

Figure 1:
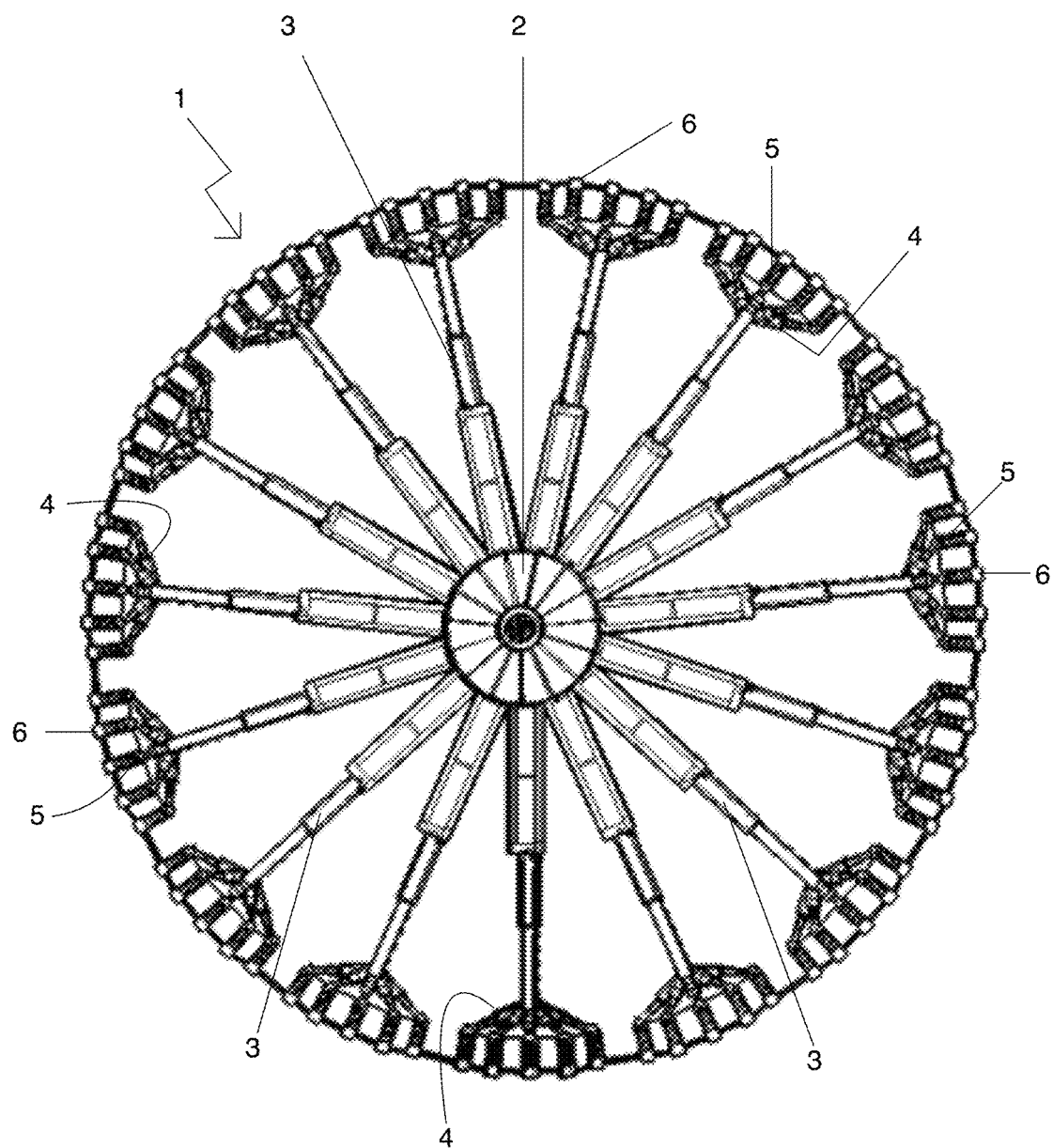
FIG. 1 is a schematic front view of one embodiment of a variable wheel with adjustable radius and tread firmness.

FIG. 1 is an illustration of one embodiment of variable wheel 1 with adjustable radius and adjustable tread firmness. Wheel 1 includes central hub assembly 2 and a plurality of primary spokes 3 radially extending outward from central hub assembly 2. A set of secondary spokes 4 may be mounted to an outer end of each primary spoke 3. Wheel 1 may include two or more secondary spokes 4 on each primary spoke 3. In the embodiment shown in FIG. 1, five secondary spokes 4 are mounted to the outer end of each primary spoke 3. Secondary spokes 4 improve the smoothness of the ride of wheel 1 by providing more contact points along the surface area of wheel 1. Primary spokes 3 and secondary spokes 4 are the load-bearing components of wheel 1. Wheel 1 may also include a suspension assembly 5 attached to an outer end of each of the secondary spokes 4 and a tread 6 attached to an outer end of each of the suspension assemblies 5. Suspension assemblies 5 control the flexibility/flattening of each tread 6. Increased flattening allows more of treads 6 to simultaneously contact the ground. Treads 6 provide the contact surface of wheel 1, i.e., treads 6 directly contact the ground over which wheel 1 rolls.

Figure 2:
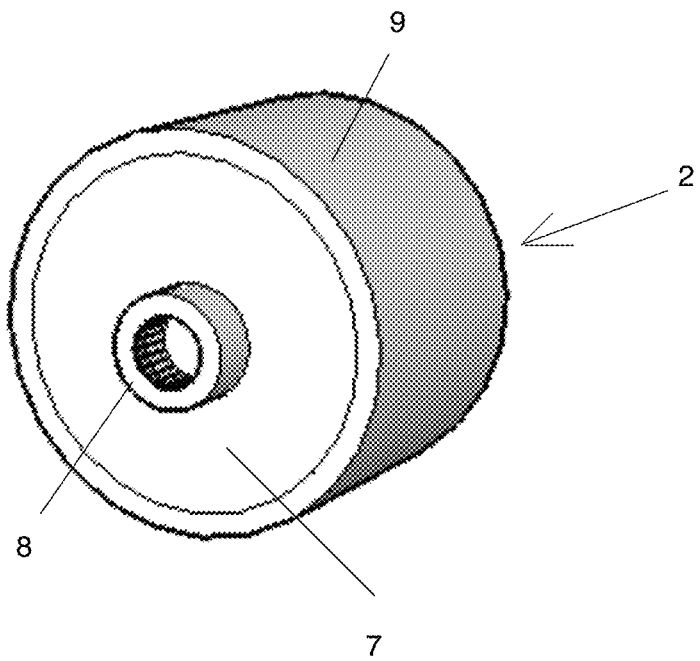
FIG. 2 is an enlarged partial perspective view of a central hub assembly of the wheel shown in FIG. 1.

With reference to FIG. 2, central hub assembly 2 includes hub housing 9 to which each primary spoke 3 is attached. Hub cap 7 may be attached to a forward end of hub housing 9. Adapter 8 is attached to an outer surface of hub cap 7. Another hub cap 7 (shown in FIG. 5) may be attached to a rearward end of hub housing 9.

When wheel 1 is locked at a given radius and tread firmness, all components of wheel 1 spin together in the direction required by a carriage's motion (i.e., there is no relative motion between the components of wheel 1). Wheel 1 may be mounted to a carriage for motion of the carriage. Central hub assembly 2 may be connected to the axle of the carriage or it may function as the full axle in the case of a carriage with a smaller frame. For example, central hub assembly 2 may serve as the full axle of a bicycle. Wheel 1 may be affixed to a carriage by securing adapter 8 (shown in FIG. 2) of central hub assembly 2 to a portion of the carriage with bolts, screws, pins, or any other fastening device.

Figure 3:
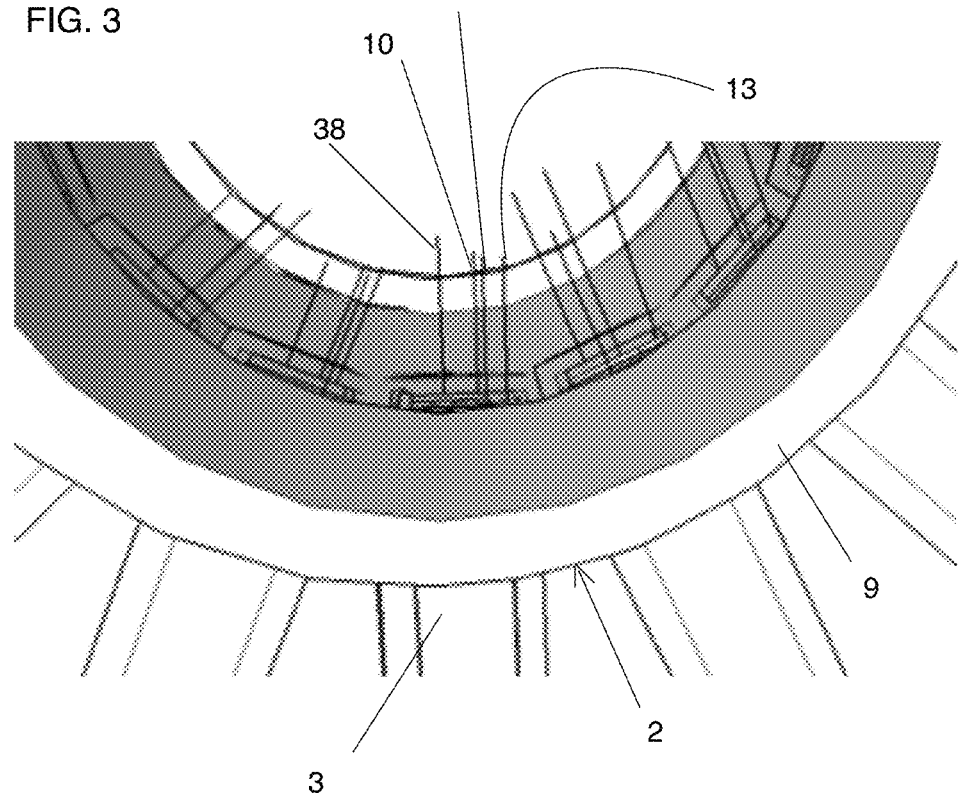
FIG. 3 is a partial perspective view of the central hub assembly and primary spokes.

FIG. 3 shows hub housing 9 of central hub assembly 2 with primary spokes 3. A cord set includes cords disposed within each primary spoke 3, with some of the cords extending into central hub assembly 2. The cord set cooperates with internal components of primary spoke 3 to mechanically manipulate or communicate the desired radius or tread firmness (also referred to as tension) set by the internal components of central hub assembly 2. All cords described herein (including all expander, contractors, and tension cords) may be formed with cables, ropes, strings, or lines formed of wire material. In the embodiment illustrated, the cord set includes primary tension cord 38, primary spoke expander 10, primary spoke contractor 11, and secondary wheel contractor 13 shown in FIG. 3. Each of these cords extends from within primary spokes 3 into central hub assembly 2. The cord set also includes other cords disposed completely within primary spoke 3, including secondary wheel expander 12, internal spoke contractor 41, internal spoke expander 61, each described in more detail below.

Figure 4:
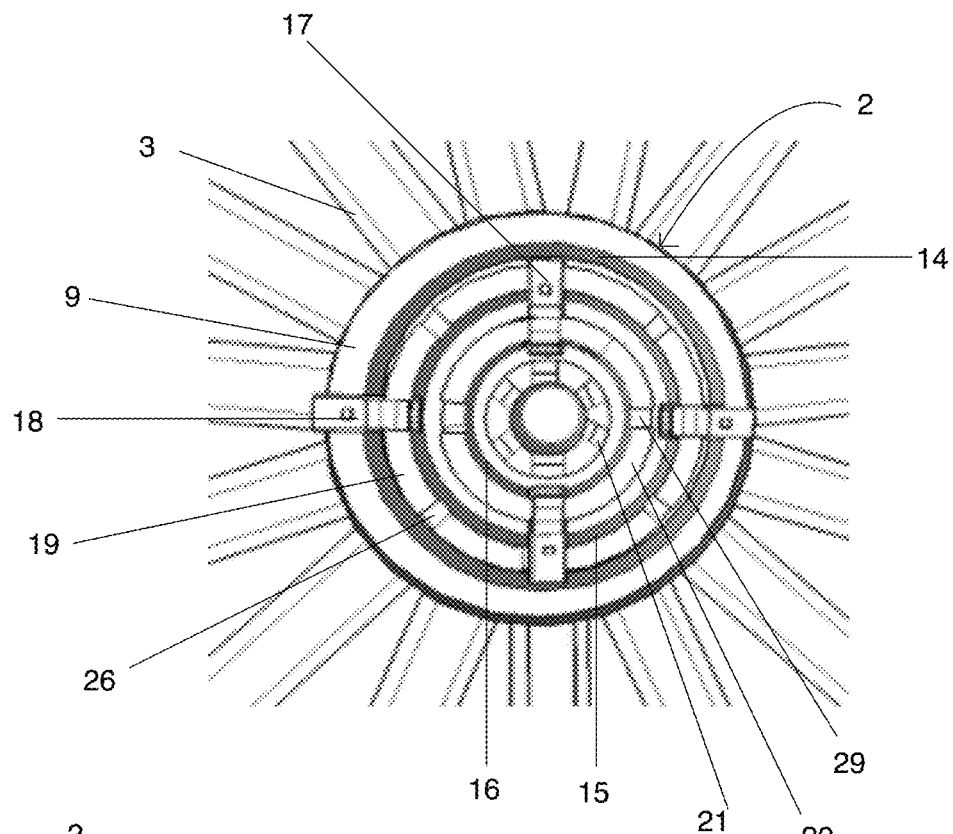
FIG. 4 is a partial front view of the central hub assembly without a hub cap.
Figure 5:
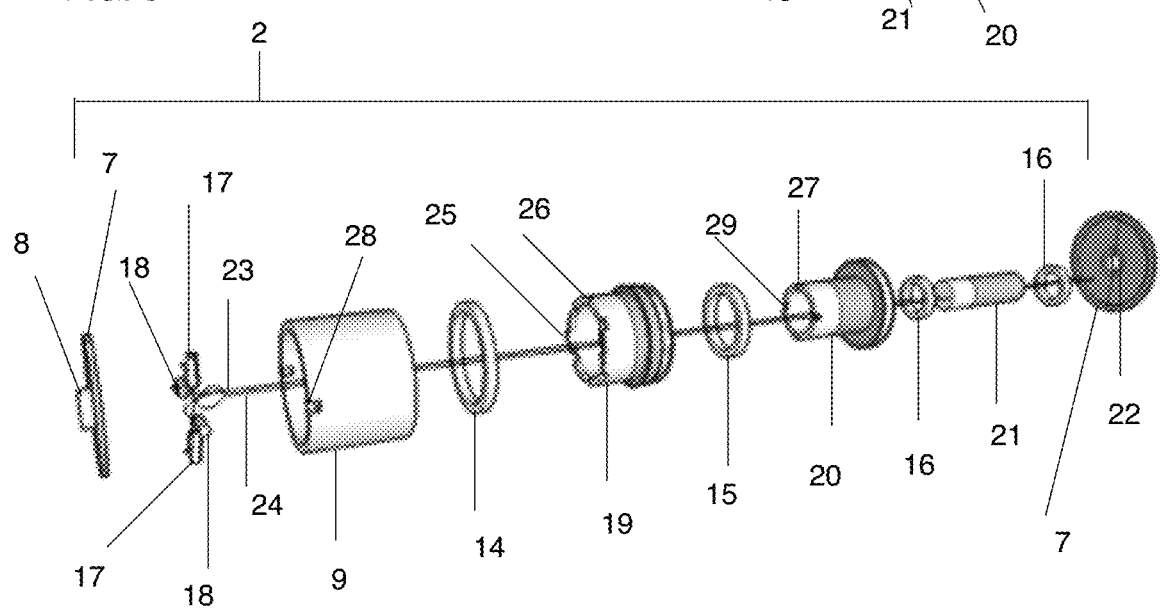
FIG. 5 is an exploded perspective view of the central hub assembly.

FIGS. 4 and 5 illustrate the components of central hub assembly 2. Hub caps 7 attach to both ends of hub housing 9. Radius wheel 19 is concentrically disposed within hub housing 9, with first spacer 14 disposed between an inner surface of hub housing 9 and an outer surface of radius wheel 19 to function as a bearing when radius wheel 19 rotates relative to hub housing 9. At least a portion of tensioner wheel 20 is concentrically disposed within radius wheel 19, with second spacer 15 disposed between an inner surface of radius wheel 19 and an outer surface of tensioner wheel 20 to function as a bearing when tensioner wheel 20 rotates relative to radius wheel 19. In one embodiment, a rearward portion of tensioner wheel 20 is disposed beyond a rearward end of radius wheel 19, but within hub housing 9. At least a portion of center sleeve 21 is concentrically disposed within tensioner wheel 20, with third spacers 16 disposed between an inner surface of tensioner wheel 20 and an outer surface of center sleeve 21. In one embodiment, a rearward portion of center sleeve 21 is disposed through center aperture 22 in rear hub cap 7 to extend beyond rear hub cap 7 to allow an external brake (not shown) to interact with center sleeve 21. The external brake is applied to center sleeve 21 to keep the internal components of central hub assembly 2 stationary while hub housing 9 spins, thereby adjusting either the radius or the tread firmness of wheel 1. First spacer 14 and second spacer 15 provide support and reduce friction between the internal components of central hub assembly 2. Spacers 14 and 15 increase longevity and structural integrity of the internal components. These spacers may be formed of any type of bearing or spacer appropriate for the expected load and forces on wheel 1, as readily understood by a skilled artisan. For example, the spacers may be formed of rubber rings, plastic rings, metal bearings, or plastic bearings. Spacer 16 is a static connection that prevents the inner surface of tensioner wheel 20 from moving independently of center sleeve 21.

Tensioner lock 17 and radius lock 18 are disposed behind the forward hub cap 7. These locks may be formed of any device capable of selectively locking together the concentrically positioned components of central hub assembly 2 to prevent relative rotation in a locked position and to allow relative rotation in an unlocked position. For example, tensioner lock 17 and radius lock 18 may be formed of spring-loaded pins, latches, or any other similar device.

Radius lock cord 23 and tensioner lock cord 24 extend from the inner ends of radius lock 18 and tensioner lock 17, respectively, through center sleeve 21 and center aperture 22 of rear hub cap 7. Radius lock cord 23 and tensioner lock cord 24 may extend away from wheel 1 for connection to an external control (not shown) for remotely locking and unlocking radius lock 18 and tensioner lock 17. In one embodiment, the external control may be formed of a switch, a knob, a button, or a continuation of the chords. The external control may be positioned at any convenient location on the carriage to which wheel 1 is mounted. For example, the external control may be positioned on a handle or dashboard of the carriage.

Radius lock 18 is mounted to radius wheel 19. For example, radius lock 18 may be attached at the radius lock connection point 25 on radius wheel 19. The attachment of radius lock 18 to radius wheel 19 may utilize a weld, glue, a bracket, or any other stable method of securing two objects together. When radius lock 18 is in a locked position (shown in FIG. 4), the outer end of radius lock 18 is secured within radius lock gap 28 (shown in FIG. 5) of hub housing 9, thereby preventing hub housing 9 from rotating relative to radius wheel 19. In other words, hub housing 9 may not spin independently from radius wheel 19 and other internal components of central hub assembly 2 with radius lock 18 in the locked position.

A user may remotely transfer radius lock 18 from the locked position into an unlocked position in order to allow hub housing 9 to rotate relative to radius wheel 19. In one embodiment, radius lock 18 may be transferred into the unlocked position by applying a tension force on radius lock cord 23 (i.e., pulling radius lock cord 23), which retracts the outer end of radius lock 18 from radius lock gap 28 of hub housing 9. In certain embodiments in which radius lock 18 is large relative to the total radius of central hub assembly 2, tensioner wheel 20 may include radius lock gap 29 to provide space for the inner end of radius lock 18 to be pulled in beyond the outer surface of tensioner wheel 20.

In other words, unlocking radius lock 18 allows hub housing 9 to spin independently of the internal components of central hub assembly 2. An external brake (not shown) may be applied to center sleeve 21. For example, the external brake may be applied to the portion of center sleeve 21 extending beyond hub cap 7. The external brake allows hub housing 9 to spin while the internal components of central hub assembly 2 remain stationary. In one embodiment, third spacers 16 are fixedly attached to center sleeve 21 and tensioner wheel 20 such that tensioner wheel 20 is rotationally locked to center sleeve 21 (i.e., tensioner wheel 20 rotates when center sleeve 21 rotates and tensioner wheel 20 remains stationary when center sleeve 21 remains stationary. The spinning of the hub housing 9 in one direction will cause the length of primary tension cord 38, and primary spoke expander 10 beyond hub housing 9 (into each primary spoke 3) to decrease while increasing the length of primary spoke contractor 11 and secondary wheel contractor 13 beyond hub housing 9 (into each primary spoke 3). Spinning hub housing 9 in the opposite direction provides the opposite change in the length of each cord extending beyond hub housing 9. As hub housing 9 spins, radius lock 18 returns to the locked position when the user removes the applied force from radius lock cord 23 and the outer end of radius lock 18 engages one of radius lock gaps 28 on hub housing 9. The number and characteristics of radius settings provided for wheel 1 may be set by the number and placement of radius lock gaps 28. The extent to which the radius is adjusted is determined by the number of rotations of hub housing 9 before the user releases the applied force from radius lock cord 23. Once radius lock 18 is again in the locked position, hub housing 9 is again prevented from spinning independently from the internal components of central hub assembly 2. In an alternate embodiment, an external brake (not shown) may be applied to hub housing 9 to prevent its rotation while the internal components of central hub assembly 2 spin.

Figure 6:
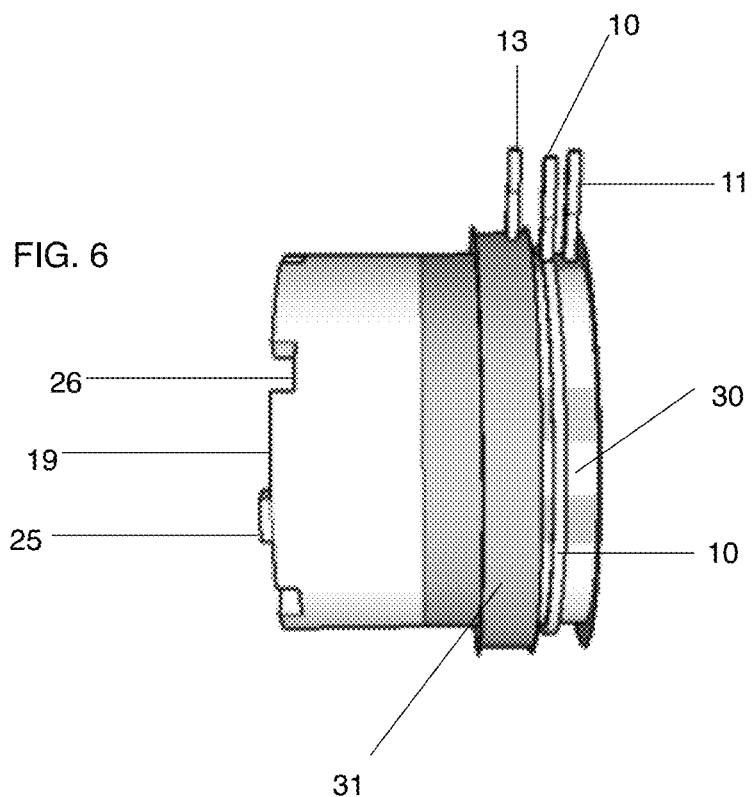
FIG. 6 is a side view of a radius wheel of the central hub assembly with cords for a single primary spoke.
Figure 7:
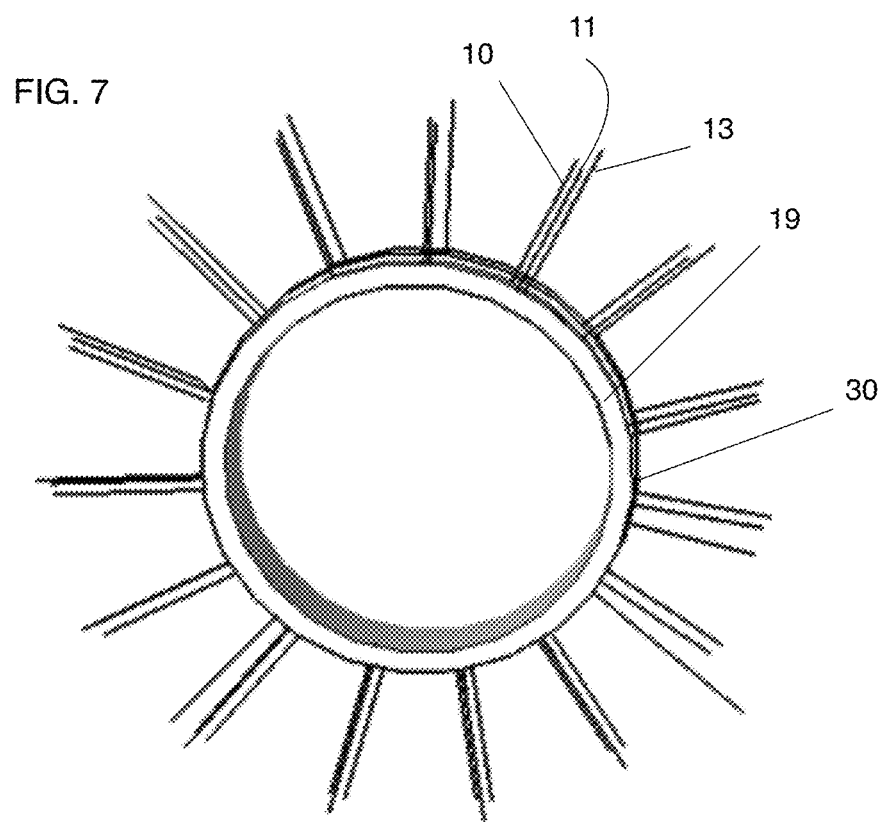
FIG. 7 is a front view of the radius wheel with cords for each of the primary spokes.

As shown in FIGS. 6 and 7, radius wheel 19 includes primary spoke portion 30 and secondary pulley portion 31. Primary spoke expander 10 and primary spoke contractor 11 for each primary spoke 3 are attached to primary spoke portion 30 of radius wheel 19. Secondary wheel contractor 13 for each primary spoke 3 is attached to secondary pulley portion 31. FIG. 6 illustrates the position of the cord set for one of primary spokes 3 when wheel 1 is in its fully expanded position (i.e., maximum radius). Namely, primary spoke expander 10 is wrapped around primary spoke portion 30, while primary spoke contractor 11 and secondary wheel contractor 13 are not wrapped around the respective portions.

With radius lock 18 in the unlocked position, rotation of hub housing 9 of central hub assembly 2 in a counterclockwise direction while radius wheel 19 remains stationary causes primary spoke contractor 11 and secondary wheel contractor 13 to wrap around primary spoke portion 30 and secondary pulley portion 31, respectively, thereby decreasing the length of each cord 11, 13 extending beyond hub housing 9 into primary spoke 3. This same relative rotation will cause primary spoke expander 10 to unwrap, thereby increasing the length of each cord 10 extending beyond hub housing 9 into primary spoke 3. Rotation of hub housing 9 in a clockwise direction causes the opposite changes in the lengths of cords 10, 11, 13.

Referring again to FIGS. 4 and 5, tensioner lock 17 is mounted to tensioner wheel 20. For example, tensioner lock 17 may be attached at the tensioner lock connection point 27 on tensioner wheel 20. The attachment of tensioner lock 17 to tensioner wheel 20 may utilize a weld, glue, a bracket, or any other stable method of securing two objects together. When the tensioner lock 17 is in a locked position (shown in FIG. 4), the outer end of tensioner lock 17 is secured within tensioner lock gap 26 (shown in FIG. 5) of radius wheel 19, thereby preventing radius wheel 19 and hub housing 9 from rotating relative to tensioner wheel 20. In other words, radius wheel 19 and hub housing 9 may not spin independently of tensioner wheel 20 with tensioner lock 17 in the locked position.

A user may remotely transfer tensioner lock 17 from the locked position into an unlocked position in order to allow radius wheel 19 and hub housing 9 to rotate as one locked unit relative to tensioner wheel 20 and the other internal components of central hub assembly 2. In one embodiment, tensioner lock 17 may be transferred into the unlocked position by applying a tension force on tensioner lock cord 24 (i.e., pulling tensioner lock cord 24), which retracts the outer end of tensioner lock 17 from tensioner lock gap 26 of radius wheel 19. With tensioner lock 17 in the unlocked position, tensioner wheel 20 is locked to the remaining internal components of central hub assembly 2, which are prevented from rotating by an external brake (not shown). For example, the external brake may be applied to center sleeve 21, which is rotationally locked to tensioner wheel 20 as described above. In this configuration, hub housing 9 spins with radius wheel 19 around stationary tensioner wheel 20. This increases or decreases (depending on the spin direction) the length of primary tension cords 38 extending beyond hub housing 9 into each primary spoke 3.

Figure 8:
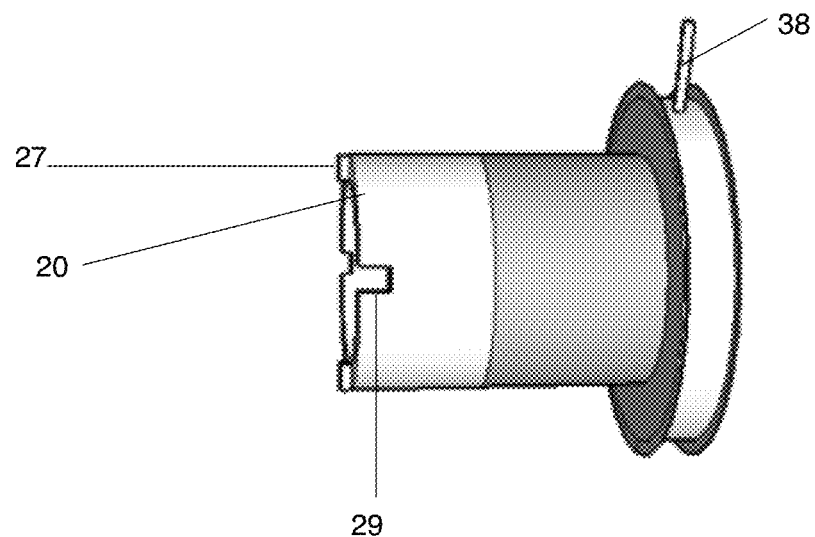
FIG. 8 is a side view of a tensioner wheel of the central hub assembly with a tensioner cord for a single primary spoke.
Figure 9:
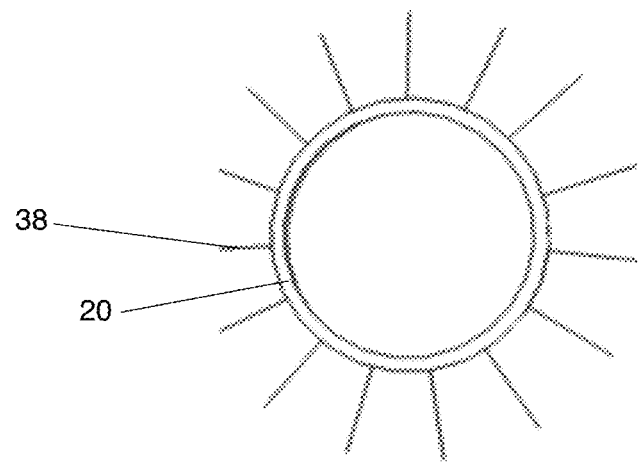
FIG. 9 is a front view of the tensioner wheel with tensioner cords for each primary spoke.

As shown in FIGS. 8 and 9, primary tension cord 38 for each primary spoke 3 is attached to a rearward portion of tensioner wheel 20. FIG. 8 illustrates the position of primary tension cord 38 for one of primary spokes 3 when wheel 1 is in its minimum firmness setting for treads 6 (i.e., maximum tread flexibility or maximum flexibility in suspension assemblies 5). Namely, primary tension cord 38 is not wrapped around the rearward portion of tensioner wheel 20. With tensioner lock 17 in the unlocked position, rotation of hub housing 9 and radius wheel 19 in either direction while tensioner wheel 20 and other internal components of central hub assembly 2 remain stationary causes primary tension cord 38 to wrap around the rearward portion of tensioner wheel 20. This decreases the length of primary tension cord 38 extending beyond hub housing 9 into primary spoke 3, thereby increasing the tread firmness (i.e., causing treads 6 to become more rigid).

As hub housing 9 and radius wheel 19 spin, tensioner lock 17 returns to the locked position when the user removes the applied force from tensioner lock cord 24 and the outer end of tensioner lock 17 engages one of tensioner lock gaps 26 in radius wheel 19. The number and characteristics of the tread firmness settings provided for wheel 1 may be set by the number and placement of tensioner lock gaps 26. The extent to which the tread firmness is adjusted is determined by the number of rotations of hub housing and radius wheel 19 before the user releases the applied force from tensioner lock cord 24. To reduce the tread firmness (i.e., increase tread flexibility and flexibility in suspension assemblies 5), tensioner lock 17 is again transferred into the unlocked position and hub housing 9 and radius wheel 19 are rotated in the opposite direction. In an alternate embodiment, an external brake (not shown) may be applied to hub housing 9 and radius wheel 19 to prevent rotation of these components while tensioner wheel 20 and the remaining internal components of central hub assembly 2 spin.

When adjusting tread firmness, radius wheel 19 spins with hub housing 9, which maintains constant lengths of primary spoke expander 10, primary spoke contractor 11, and secondary wheel contractor 13 extending beyond hub housing 9 into primary spoke 3. In other words, the extent to which each of cords 10, 11, 13 are wrapped around radius wheel 19 is not changed while tread firmness is adjusted. Accordingly, a constant radius of wheel 1 is maintained while tread firmness is adjusted.

When adjusting the radius of wheel 1, radius wheel 19 remains stationary with tensioner wheel 20 while hub housing 9 spins. This changes the length of primary tension cord 38 along with cords 10, 11, and 13, and thereby maintains the same tension in primary tension cord 38 as the length of primary spokes 3 and any secondary spokes 4 are changed (i.e., to compensate for the change in the length of spokes 3, 4). Accordingly, a constant tread firmness of wheel 1 is maintained while the radius is adjusted.

In an alternate embodiment, tensioner lock 17 and radius lock 18 may be formed of latches that move in a seesaw pattern. When locked, the outer ends are secured within tensioner lock gap 26 and radius lock gap 28, respectively. A force applied to tensioner lock cord 24 pulls the inner end of tensioner lock 17 causing tensioner lock 17 to pivot at tensioner lock connection point 27. The outer end of tensioner lock 17 pivots toward forward hub cap 7 and the inner end (connected to tensioner lock cord 24) pivots in the direction in which tensioner lock cord 24 is pulled. A spring located at the pivot point of tensioner lock 17 biases tensioner lock 17 to return it to the locked position when the applied force is removed from tensioner lock cord 24. Radius lock 18 functions in the same way.

The external brake that is applied to center sleeve 21 may be a brake that stops the motion of the carriage to which wheel 1 is mounted, or it may be a secondary brake system. When the brake is engaged in both embodiments, the internal components of the central hub assembly 2 remain stationary. A driver rotates the unlocked and non-stationary components of central hub assembly 2. In one embodiment, the driver may be a motor. In another embodiment, the carriage is a baby stroller and the user may act as the driver by pushing the stroller, which causes the outer components of wheel 1 to spin. When the user applies the external brake to center sleeve 21, unlocks specific internal components via the external controls (or switches), and moves the carriage, the outer components of central hub assembly 2 rotate around the internal stationary components in the manner described above. In another embodiment, a brake for the stroller may be applied to central hub assembly 2 and a separate driver (such as a foot pedal or a motor) may spin center sleeve 21. In both embodiments, one set of components of the central hub assembly 2 spin while the other components remain stationary with the external brake. The user may change the radius or the tread flexibility of wheel 1 while wheel 1 is in use or under a load. In other embodiments, the carriage may include both external brake systems to allow users the option of changing the radius or the tread flexibility of wheel 1 while wheel 1 is in motion or when wheel 1 is stationary.

FIG. 10 shows one of the primary spokes 3 with attached secondary spokes 4. In this embodiment, primary spoke 3 includes first segment 32, second segment 33, and third segment 34 telescopically connected together. Segments 32, 33, 34 assist in bearing a load applied to wheel 1. Segments 32, 33, 34 enable the radius of wheel 1 to change from a fully extended radius to about ⅓ of the original radius by telescoping second segment 33 and third segment 34 into first segment 32. Primary tension cord 38, primary spoke expander 10, primary spoke contractor 11, and secondary wheel contractor 13 extend from central hub assembly 2 into primary spoke 3 at an upper end of first segment 32. Secondary spokes 4 are connected to a lower end of third segment 34. In this embodiment, secondary spokes 4 include secondary spokes 4A, 4B, 4C, 4D, and 4E. Central secondary spoke 4C is in line with third segment 34. Mid secondary spokes 4B, 4D and outer secondary spokes 4A, 4E are connected to either side of the lower end of third segment 34, with mid secondary spokes 4B, 4D disposed between central secondary spoke 4C and either outer secondary spokes 4A, 4E, respectively. Except as otherwise noted, each secondary spoke 4 has the same structure and function as primary spokes 3. Secondary spokes 4 have a smaller length that primary spokes 3. Other embodiments may include fewer or more segments than shown in secondary spokes 4 and/or fewer or more secondary spokes 4 than shown for each primary spoke 3, depending on radius requirements for the wheel and to achieve different radius variations.

Secondary spokes 4 are attached to primary spokes 3 such that (a) there is an equal distance from a center of wheel 1 to an outer center point of all secondary spokes 4 of wheel 1, and (b) there is an equal distance between the outer center points of each adjacent secondary spoke 4 of wheel 1. Accordingly, the angle made with the outer center point of two adjacent secondary spokes 4 relative to central hub assembly 2 remains constant. Secondary spokes 4 provide a smoother ride for the carriage to which wheel 1 is attached. Secondary spokes 4 also reduce the number of primary spokes 3 required. The number of primary spokes 3 and secondary spokes 4 may be a function of the required load and carriage ride characteristics.

With reference to FIGS. 11A-11C, first segment 32, second segment 33, and third segment 34 of primary spoke 3 each includes an outer frame and an inner cavity. Second segment 33 is at least partially disposed within the inner cavity of first segment 32, and third segment 34 is at least partially disposed within the inner cavity of second segment 33. When primary spoke 3 is contracted (i.e., its length is reduced) to reduce the radius of wheel 1, second segment 33 slides further into the inner cavity of first segment 32 and third segment 34 slides further into the inner cavity of second segment 33.

First segment 32 may include first pulley 40 attached at its upper end and mount point 62 positioned at its lower end. First pulley 40 may be formed of a wheel, peg, post, or any other structure configured to provide a sliding surface for a cable or cord. Mount point 62 may be formed of a screw, staple, hook, or any other structure configured to secure an end of a cable or cord to the lower end of first segment 32. Second segment 33 may include first stopper 39 at its upper end and second pulley 42 and third pulley 43 at its lower end. First stopper 39 is configured to retain the upper end of second segment 33 within the inner cavity of first segment 32. First stopper 39 may be formed of a bar, peg, or any other structure configured to prevent second segment 33 from slipping out of the inner cavity of first segment 32. Second and third pulleys 42, 43 may each be formed of a wheel, peg, post, or any other structure configured to provide a sliding surface for a cable or cord. Third segment 34 may include second stopper 60 at its upper end. Second stopper 60 is configured to retain the upper end of third segment 34 within the inner cavity of second segment 33. Second stopper 60 may be formed of a bar, peg, or any other structure configured to prevent third segment 34 from slipping out of the inner cavity of second segment 33. Third segment 34 may also include secondary wheel 44, tension pulley 45, and tensioner spring 46 attached to a lower end of third segment 34. Secondary wheel 44 is fixedly attached within the inner cavity of third segment 34. Alternatively, secondary wheel 44 is secured within a separate housing that is affixed to the lower end of third segment 34. Secondary wheel 44 is described in more detail below. Tension pulley 45 is slidingly disposed within the inner cavity of third segment 34, with tensioner spring 46 biasing tension pulley 45 toward the lower end of third segment 34. Tension pulley 45 may be formed of a peg or bar configured to be secured to an end of a cord and also to provide a sliding surface for a second cord. Tensioner spring 46 may be formed of a tension spring or a compression spring depending upon the configuration of these components. In the embodiment shown in FIG. 11C, tensioner spring 46 is a tension spring having a lower end affixed to the lower end of third segment 34 and its upper end affixed to tension pulley 45.

The radius setting and the tread firmness setting of wheel 1 is set by a system of cords that interact with pulleys and other structures in wheel 1. Wheel 1 includes a radius cord system that extends from central hub assembly 2 into each primary spoke 3 and each secondary spoke 4. Adjusting the settings of the radius cord system in central hub assembly 2 extends or contracts each primary spoke 3 and each secondary spoke 4. Wheel 1 also includes a firmness cord system that extends from central hub assembly 2 through each primary spoke 3, through each secondary spoke 4, and into each suspension assembly 5. Adjusting the settings of the firmness cord system in central hub assembly 2 increases or decreases the firmness of suspension assembly 5 (i.e., increases or decreases the tread firmness).

With reference to FIGS. 11A-11C, the radius cord system includes primary spoke expander 10, primary spoke contractor 11, and secondary wheel contractor 13 all of which extend from central hub assembly 2 into primary spoke 3 through the inner cavity of first segment 32. The radius cord system also includes secondary wheel expander 12, internal spoke expander 61, and internal spoke contractor 41 which are housed completely within primary spoke 3. The radius cord system further includes secondary spoke cords (shown and described below) for translating radius adjustments from third segment 34 of primary spoke 3 to each associated secondary spoke 4.

Figure 12A:
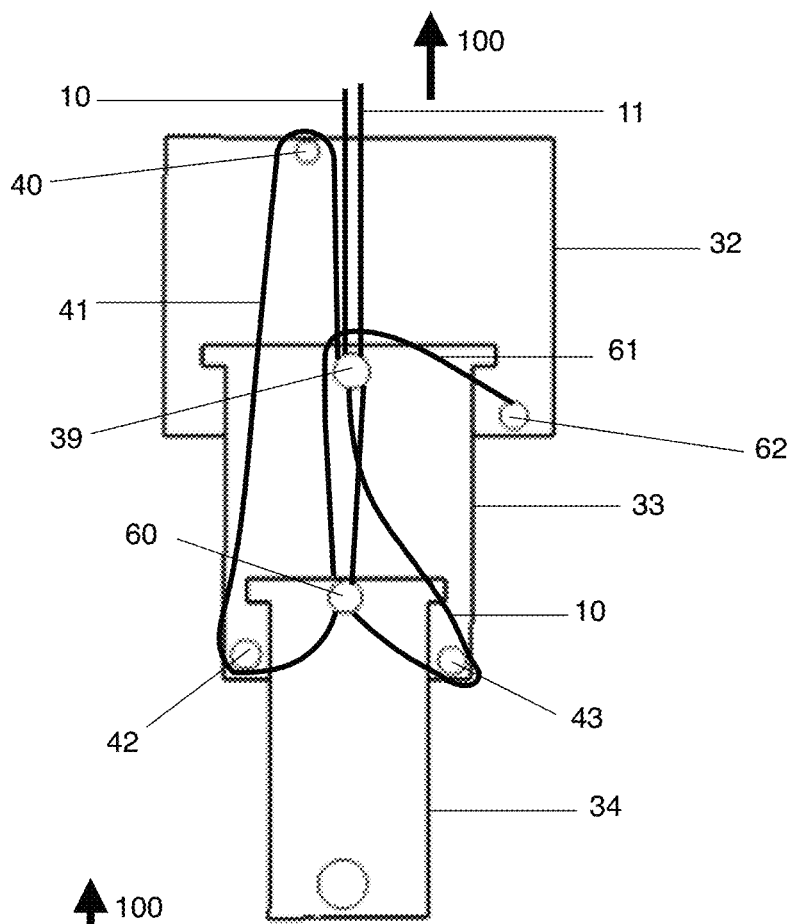
FIG. 12A is a schematic view of primary spoke components of a radius cord system, with the primary spoke in the fully extended position.
Figure 12B:
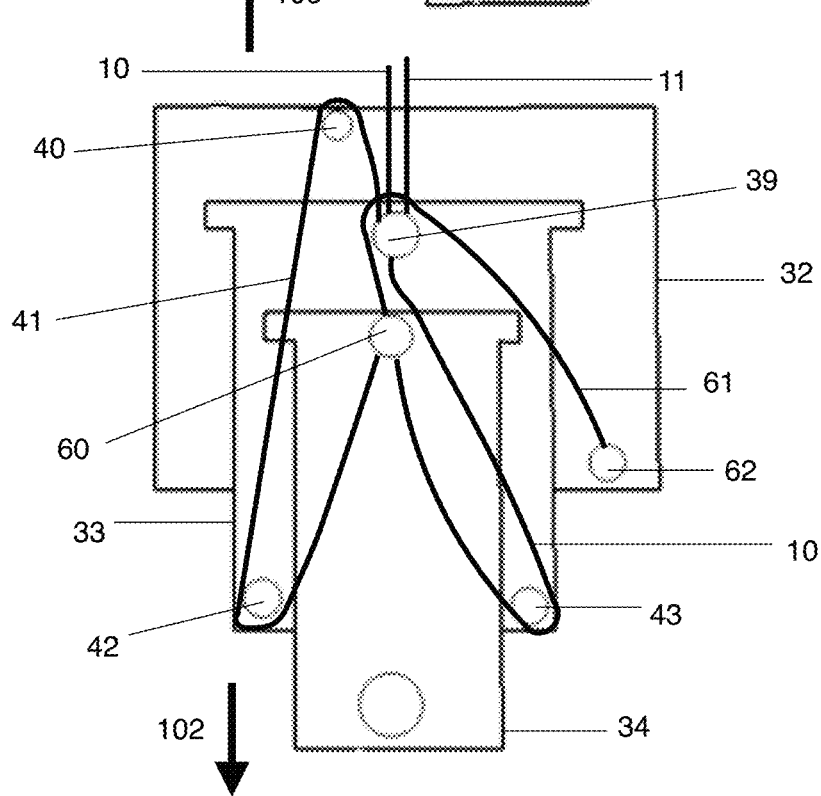
FIG. 12B a schematic view of the primary spoke components of the radius cord system, with the primary spoke in a contracted position.

FIGS. 12A and 12B illustrate the primary spoke components of the radius cord system, which include primary spoke expander 10, primary spoke contractor 11, internal spoke expander 61, and internal spoke contractor 41. Primary spoke expander 10 extends from radius wheel 19 in central hub assembly 2, through the inner cavities of first and second segments 32, 33 of primary spoke 3, around third pulley 43 at the lower end of second segment 33, and to second stopper 60 at the upper end of third segment 34. In other words, a first end of primary spoke expander 10 is attached to radius wheel 19 and a second end of primary spoke expander 10 is attached to second stopper 60. Primary spoke contractor 11 extends from radius wheel 19 in central hub assembly 2, through the inner cavities of first and second segments 32, 33, to the upper end of third segment 34 where it may be attached second stopper 60. In other words, a first end of primary spoke contractor 11 is attached to radius wheel 19 and a second end of primary spoke contractor 11 is attached to the upper end of third segment 34. Internal spoke expander 61 extends from mount point 62 around first stopper 39, to the upper end of third segment 34 where it may be attached to second stopper 60. In other words, a first end of internal spoke expander 61 is attached to mount point 62 and a second end of internal spoke expander 61 is attached to the upper end of third segment 34. Internal spoke contractor 41 extends from the upper end of second segment 33, around first pulley 40, around second pulley 42, to second stopper 60. In other words, a first end of internal spoke contractor 41 is attached to the upper end of second segment 33 and a second end of internal spoke contractor 41 is attached to second stopper 60.

FIG. 12A schematically illustrates primary spoke 3 in the fully extended position. When radius wheel 19 is rotated relative to hub housing 9 in a direction that decreases the length of primary spoke contractor 11 extending beyond hub housing 9, primary spoke contractor 11 is pulled in direction 100 (into central hub assembly 2), which pulls third segment 34 in direction 100 (into the inner cavity of second segment 33) due to primary spoke contractor 11 being attached to the upper end of third segment 34. The movement of third segment 34 in direction 100 pulls second segment 33 in direction 100 (into the inner cavity of first segment 32) due to the configuration of internal spoke contractor 41 with first and second pulleys 40, 42 and the connection of its ends to second stopper 60 and the upper end of second segment 33. In other words, primary spoke contractor 11 pulls third segment 34 and internal spoke contractor 41 pulls second segment 33. In this way, rotation of radius wheel 19 tensions primary spoke contractor 11 to contract primary spoke 3 and to reduce the radius of wheel 1.

FIG. 12B schematically illustrates primary spoke 3 in the fully contracted position. When radius wheel 19 is rotated relative to hub housing 9 in a direction that decreases the length of primary spoke expander 10 extending beyond hub housing 9, primary spoke expander 10 is pulled in direction 100 (into central hub assembly 2), which pulls third segment 34 in direction 102 (to slide partially out of the inner cavity of second segment 33) due to the configuration of primary spoke expander 10 with third pulley 43 and its attachment to second stopper 60. The movement of third segment 34 in direction 102 pulls second segment 33 in direction 102 (to slide partially out of the inner cavity of first segment 32) due to the configuration of internal spoke expander 61 with first stopper 39. In other words, primary spoke expander 10 expands third segment 34 and internal spoke expander 61 expands second segment 33. In this way, rotation of radius wheel 19 tensions primary spoke expander 10 to expand primary spoke 3 and to increase the radius of wheel 1.

Figure 13A:
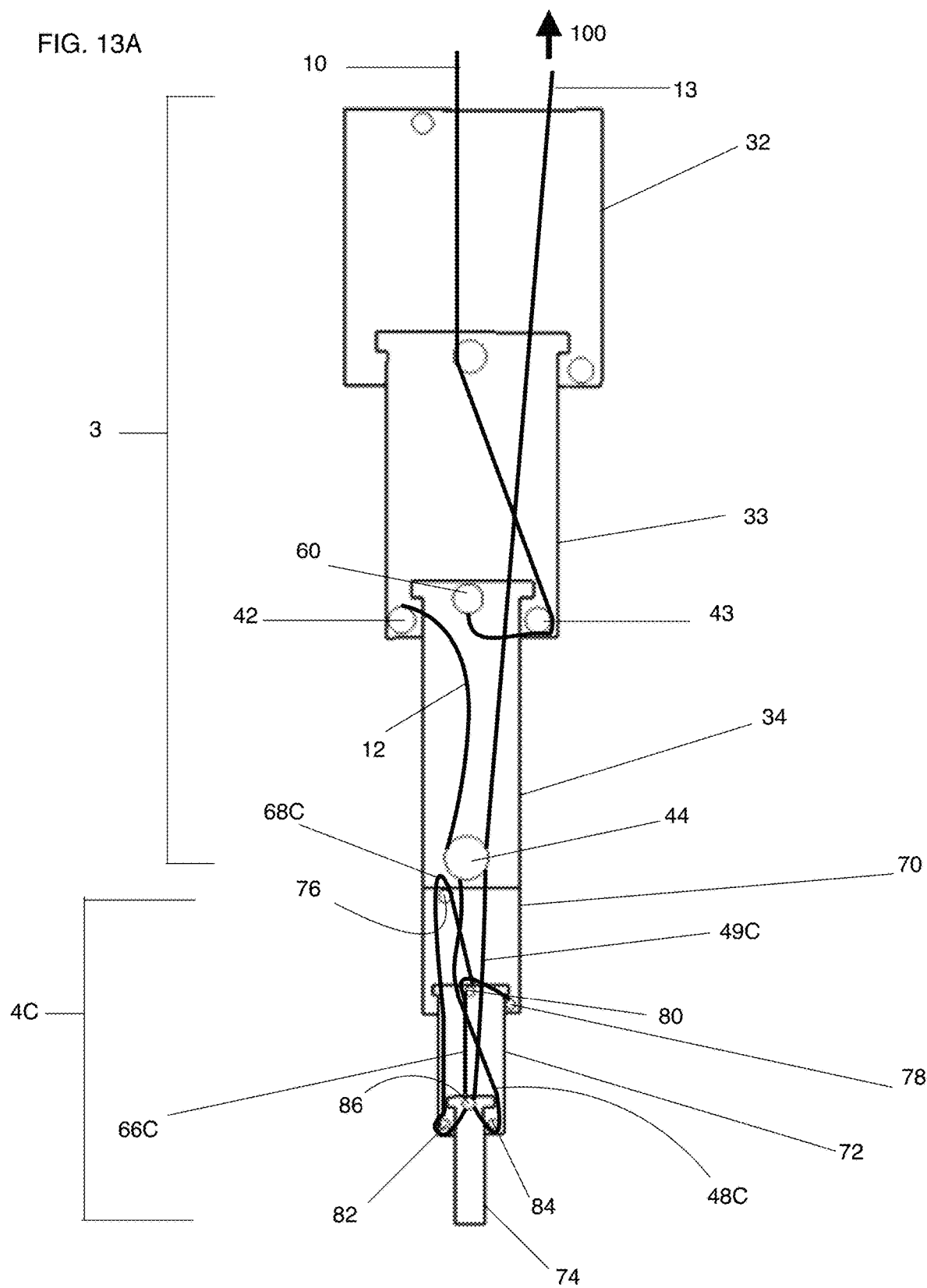
FIG. 13A is a schematic view of secondary spoke components of the radius cord system, with the secondary spoke in the fully extended position.

FIGS. 13A and 13B illustrate the secondary spoke components of the radius cord system, along with one embodiment of secondary spoke 4C. Except as otherwise noted, secondary spoke 4C includes analogous structures and functions to each structure and function of primary spoke 3. Secondary spoke 4C includes first segment 70, second segment 72, and third segment 74, with each segment slidingly disposed within the inner cavity of the segment above. First segment 70 includes first pulley 76 at its upper end and mount point 78 at its lower end. Second segment 72 includes first stopper 80 at its upper end and second pulley 82 and third pulley 84 at its lower end. Third segment 74 includes second stopper 86 at its upper end. Each of secondary spokes 4A, 4B, 4D, and 4E and all other secondary spokes of wheel 1 may have the same components described in connection with secondary spoke 4C, including pulleys and cords.

Referring still to FIGS. 13A and 13B, the components for secondary spoke 4C of the radius cord system include secondary wheel expander 12, secondary wheel contractor 13, secondary spoke expander 48C, secondary spoke contractor 49C, secondary internal expander 66C, and secondary internal contractor 68C. Generally, secondary wheel expander and contractor 12, 13 extends to secondary wheel 44 in primary spoke 3; secondary wheel expander 12 extends from an attachment point at the lower end of second segment 33 of primary spoke 3 to secondary wheel 44 in primary spoke 3; secondary spoke expander and contractor 48C, 49C extend from secondary wheel 44 in primary spoke 3 to secondary spoke 4C; and secondary internal expander and contractor 66C, 68C are housed completely within secondary spoke 4C.

More specifically, secondary wheel contractor 13 extends from radius wheel 19 in central hub assembly 2 through the inner cavities of first, second, and third segments 32, 33, 34, to secondary wheel 44 at the lower end of third segment 34 of primary spoke 3. Secondary wheel expander 12 extends from an attachment point at the lower end of second segment 33 of primary spoke 3 to secondary wheel 44 in primary spoke 3. Secondary spoke expander 48C extends from secondary wheel 44 in primary spoke 3, through the inner cavities of first and second segments 70, 72 of secondary spoke 4C, around third pulley 84 at the lower end of second segment 72, and to second stopper 86 at the upper end of third segment 74. In other words, a first end of secondary spoke expander 48C is attached to secondary wheel 44 and a second end of secondary spoke expander 48C is attached to second stopper 86. Secondary spoke contractor 49C extends from secondary wheel 44 in primary spoke 3, through the inner cavities of first and second segments 70, 72 of secondary spoke 4C, to the upper end of third segment 74 where it may be attached second stopper 86. In other words, a first end of secondary spoke contractor 49C is attached to secondary wheel 44 and a second end of secondary spoke contractor 49C is attached to the upper end of third segment 74. Secondary internal expander 66C extends from mount point 78 around first stopper 80, to the upper end of third segment 74 where it may be attached to second stopper 86. In other words, a first end of secondary internal expander 66C is attached to mount point 78 and a second end of secondary internal expander 66C is attached to the upper end of third segment 74. Secondary internal contractor 68C extends from the upper end of second segment 72, around first pulley 76, around second pulley 82, to second stopper 86. In other words, a first end of secondary internal contractor 68C is attached to the upper end of second segment 72 and a second end of secondary internal contractor 68C is attached to second stopper 86. Secondary spokes 4A, 4B, 4D, and 4E and all other secondary spokes of wheel 1 may each include the same components described in connection with secondary spoke 4C, including first, second, and third segments, secondary spoke expander 48, secondary spoke contractor 49, secondary internal expander 66, and secondary internal contractor 68.

Figure 14:
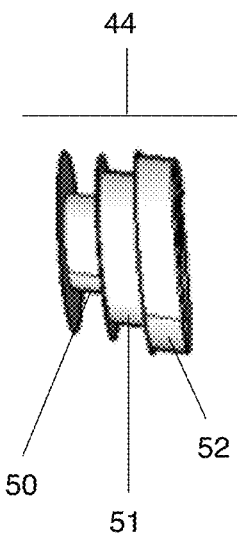
FIG. 14 is a perspective view of a secondary wheel attached to a lower end of the third segment of the primary spoke.
Figure 15:
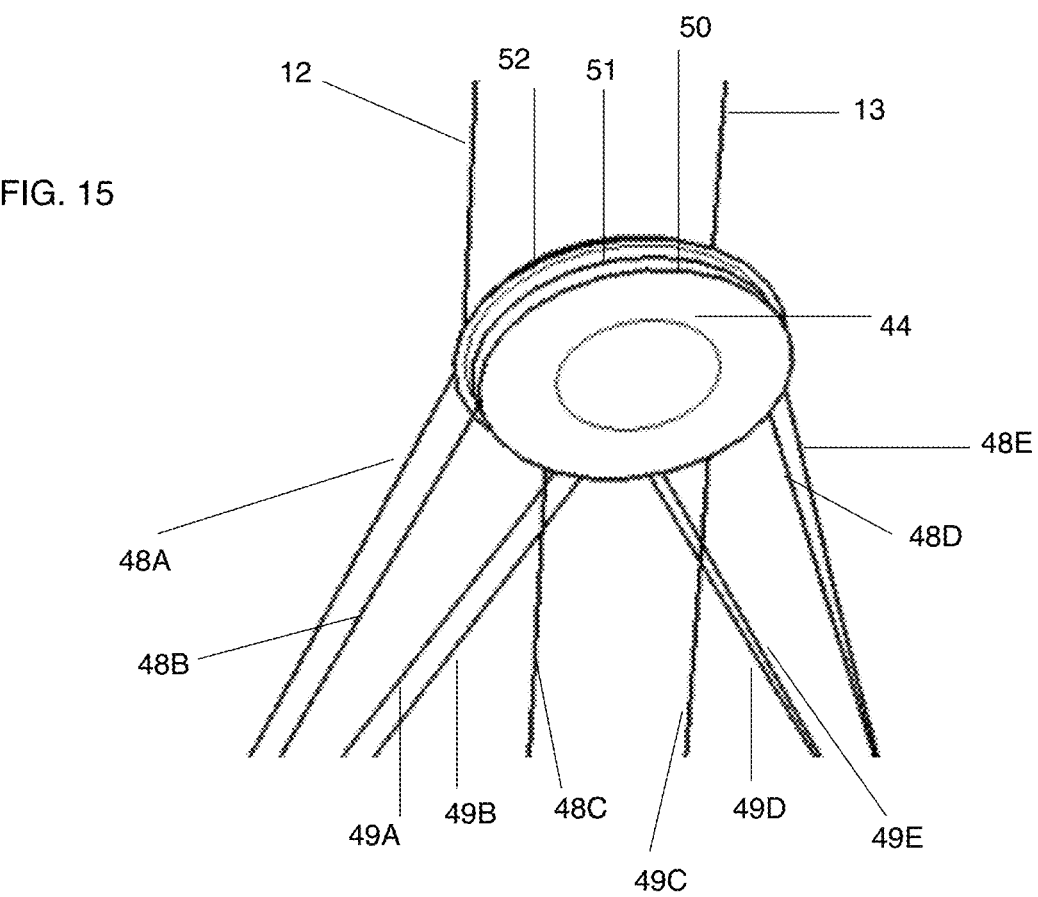
FIG. 15 is a perspective view of the secondary wheel with radius adjustment cords attached for each of the secondary spokes.

With reference to FIGS. 14 and 15, secondary wheel 44 includes sections having varied diameters. The varying diameters allow the cords attached to secondary wheel 44 to maintain a constant distance between the outer center points of adjacent secondary spokes 4. The varying diameters also force the distance between the center of wheel 1 and the outer center point of all secondary spokes 4 to be identical as the radius of wheel 1 is adjusted. In this embodiment, secondary spoke 4C (the smallest secondary spoke) is associated with central spoke portion 50 (the smallest portion) of secondary wheel 44. Secondary spokes 4B and 4D (the mid-sized secondary spokes) are associated with mid spoke portion 51 (the mid-sized portion) of secondary wheel 44. Secondary spokes 4A and 4E (the longest secondary spokes) are associated with outer spoke portion 52 (the largest portion) of secondary wheel 44. As shown in FIG. 15, secondary spoke expander 48C and secondary spoke contractor 49C for secondary spoke 4C are attached to central spoke portion 50 of secondary wheel 44; secondary spoke expanders 48B, 48D and secondary spoke contractors 49B, 49D for secondary spokes 4B, 4D, respectively, are attached to mid spoke portion 51 of secondary wheel 44; and secondary spoke expanders 48A, 48E and secondary spoke contractors 49A, 49E for secondary spokes 4A, 4E, respectively, are attached to outer spoke portion 52 of secondary wheel 44. In other embodiments, secondary wheel 44 may include fewer or more variable sized portions to accommodate the number of secondary spokes 4 attached to each primary spoke 3.

Referring still to FIGS. 14 and 15, secondary wheel expander 12 and secondary wheel contractor 13 are attached to secondary wheel 44. In certain embodiments, secondary wheel expander 12 and secondary wheel contractor 13 are attached to outer spoke portion 52 or mid spoke portion 51 of secondary wheel 44. Portions 50, 51, 52 spin as one locked unit when either secondary wheel expander 12 or secondary wheel contractor 13 is tensioned. When secondary wheel contractor 13 is tensioned by central hub assembly 2, secondary wheel 44 spins in a direction that tensions secondary spoke contractors 49A, 49B, 49C, 49D, 49E. This reduces the length of each associated secondary spoke 4A, 4B, 4C, 4D, 4E as described in more detail below. When secondary wheel expander 12 is tensioned the expansion of third segment 34 from second segment 33 in primary spoke 3, secondary wheel 44 spins in the opposite direction to tension secondary spoke expanders 48A, 48B, 48C, 48D, 48E. This increases the length of each associated secondary spoke 4A, 4B, 4C, 4D, 4E as described in more detail below.

The details of the expansion and contraction of one secondary spoke 4C is shown in FIGS. 13A and 13B. FIG. 13A schematically illustrates secondary spoke 4C in the fully extended position. When radius wheel 19 is rotated relative to hub housing 9 in a direction that decreases the length of secondary wheel contractor 13 extending beyond hub housing 9, secondary wheel contractor 13 is pulled in direction 100 (into central hub assembly 2), which rotates secondary wheel 44 in a direction that pulls secondary spoke contractor 49C in direction 100 (clockwise in FIG. 13A) due to the connection of both secondary wheel contractor 13 and secondary spoke contractor 49C to secondary wheel 44. The movement of secondary spoke contractor 49C in direction 100 pulls third segment 74 in direction 100 (into the inner cavity of second segment 72) due to secondary spoke contractor 49C being attached to the upper end of third segment 74. The movement of third segment 74 in direction 100 pulls second segment 72 in direction 100 (into the inner cavity of first segment 70) due to the configuration of secondary internal contractor 68C with first and second pulleys 76, 82 and the connection of its ends to second stopper 86 and the upper end of second segment 72. In other words, secondary spoke contractor 49C pulls third segment 74 and secondary internal contractor 68C pulls second segment 72. In this way, rotation of radius wheel 19 tensions secondary wheel contractor 13 to rotate secondary wheel 44, tension secondary spoke contractor 49C, and contract secondary spoke 4C (along with all other secondary spokes of wheel 1), thereby reducing the radius of wheel 1.

FIG. 13B schematically illustrates secondary spoke 4C in the fully contracted position. When third segment 34 of primary spoke 3 is expanded from second segment 33, tension is applied to secondary wheel expander 12 in direction 100 (toward central hub assembly 2), which rotates secondary wheel 44 in a direction that pulls secondary spoke expander 48C in direction 100 (counterclockwise in FIG. 13B) due to the connection of both secondary wheel expander 12 and secondary spoke expander 48C to secondary wheel 44. The movement of secondary spoke expander 48C in direction 100 pulls third segment 74 in direction 102 (to slide partially out of the inner cavity of second segment 72) due to the configuration of secondary spoke expander 48C with third pulley 84 and its attachment to second stopper 86. The movement of third segment 74 in direction 102 pulls second segment 72 in direction 102 (to slide partially out of the inner cavity of first segment 70) due to the configuration of secondary internal expander 66C with first stopper 80. In other words, secondary spoke expander 48C expands third segment 74 and secondary internal expander 66C expands second segment 72. In this way, expansion of primary spoke 3 tensions secondary wheel expander 12 to rotate secondary wheel 44, tension secondary spoke expander 48C, and expand secondary spoke 4C (along with all other secondary spokes of wheel 1), thereby increasing the radius of wheel 1.

With reference to FIGS. 11A-11C and 16A-16C, the firmness cord system includes primary tension cord 38 extending from central hub assembly 2 to third segment 34 of primary spoke 3, and secondary tension cord 47C for secondary spoke 4C extending from third segment 34 to suspension assembly 5. Primary tension cord 38 extends from tensioner wheel 20 in central hub assembly 2 through the inner cavities of first, second, and third segments 32, 33, 34, to tension pulley 45 in third segment 34 of primary spoke 3. In other words, a first end of primary tension cord 38 is attached to tensioner wheel 20 in central hub assembly 2 and a second end of primary tension cord 38 is attached to tension pulley 45. Secondary tension cord 47C extends from secondary wheel 44 in third segment 34 of primary spoke 3, around tension pulley 45 in third segment 34, through the inner cavities of first, second, and third segments 70, 72, 74 of secondary spoke 4C, and into suspension assembly 5C. When the tension in primary tension cord 38 changes, the vertical position of tension pulley 45 changes within third segment 34 of primary spoke 3. This action controls the amount of slack in secondary tension cord 47C and the amount of flexibility allowed in suspension assembly 5C. Tensioner spring 46 applies a downward force on tension pulley 45 to prevent slack from forming in primary tension cord 38. In other embodiments, tension pulley 45 may be positioned at different vertical positions within primary spoke 3 by using additional pulleys in third segment 34 of primary spoke 3 and additional wheels in central hub assembly 2 depending on the load requirements. Secondary spokes 4A, 4B, 4D, and 4E and all other secondary spokes of wheel 1 may each include the same components described in connection with secondary spoke 4C, including secondary tension cord 47 and all components of suspension assembly 5.

Figure 17:
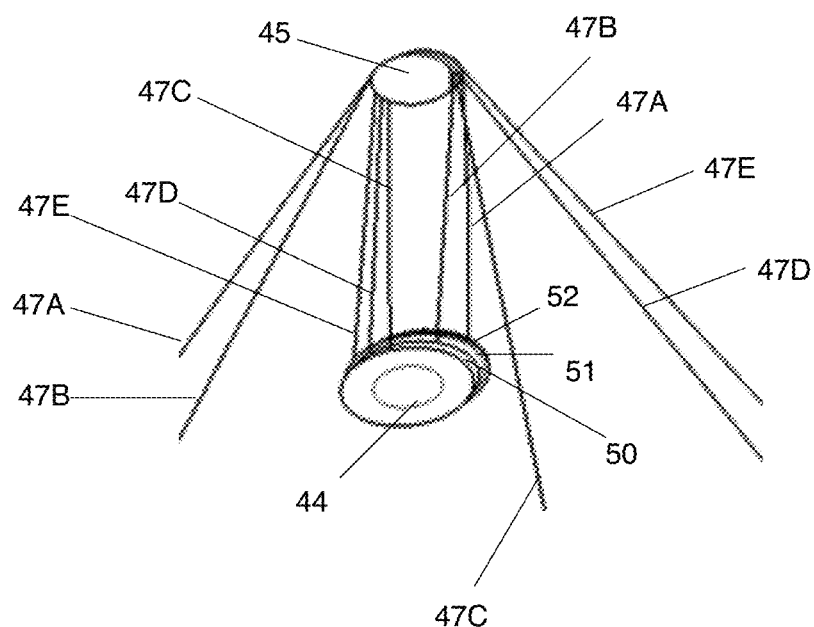
FIG. 17 is a perspective view of the secondary wheel with a secondary tension cord attached for each of the secondary spokes.

As shown in FIG. 17, secondary tension cord 47C for secondary spoke 4C is attached to central spoke portion 50 of secondary wheel 44; secondary tension cords 47B, 47D for secondary spokes 4B, 4D, respectively, are attached to mid spoke portion 51 of secondary wheel 44; and secondary tension cords 47A, 47E for secondary spokes 4A, 4E, respectively, are attached to outer spoke portion 52 of secondary wheel 44. Each of secondary tension cords 47A, 47B, 47C, 47D, 47E extends around tension pulley 45 before entering the associated secondary spoke 4A, 4B, 4C, 4D, 4E. Spinning secondary wheel 44 does not change the tension on secondary tension cords 47A, 47B, 47C, 47D, 47E, but it does maintain the tension or slack already set.

Figures 18A, 18B:
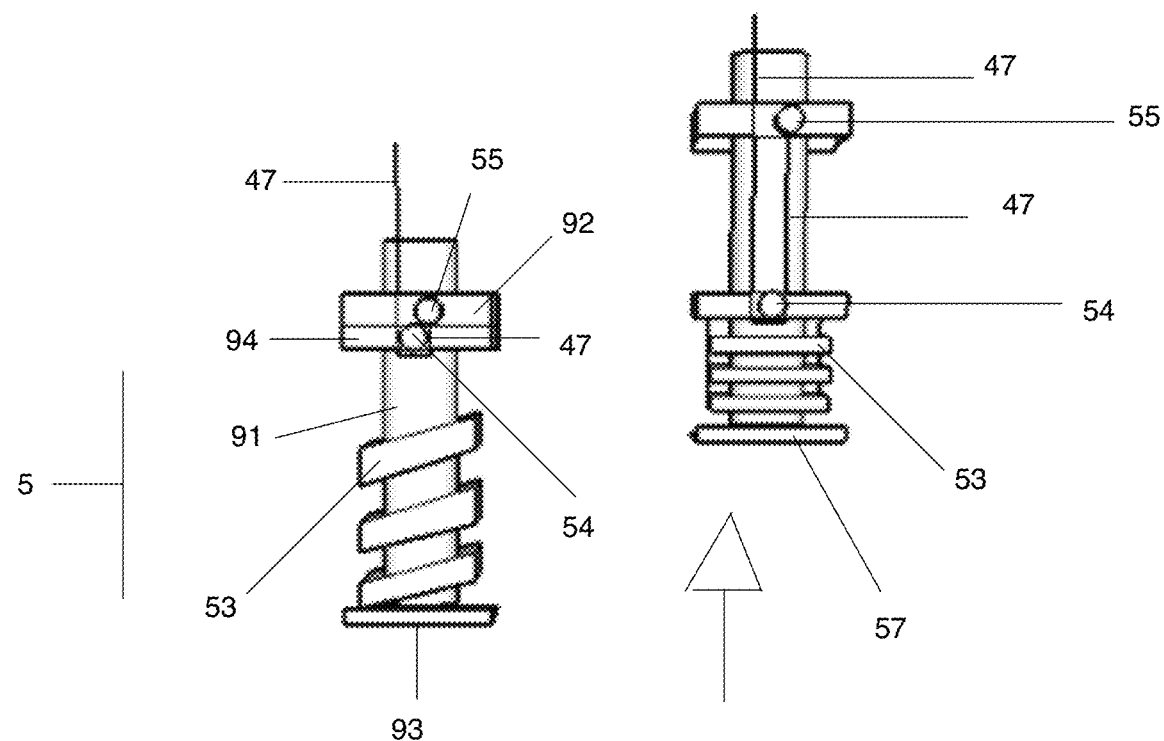
FIG. 18A is a front view of the suspension assembly in the locked position.
FIG. 18B is a front view of the suspension assembly in the compressed position.

With reference to FIGS. 18A and 18B, each suspension assembly 5 of wheel 1 controls the degree of flexibility or firmness in the associated tread 6. Each suspension assembly 5 includes central rod 91, first frame 92 fixed to a predetermined position on central rod 91, and second frame 93 fixed to a distal end of central rod 91. Accordingly, there is no relative motion between central rod 91 and first and second frames 92, 93. Suspension assembly 5 also includes sliding frame 94 attached to the lower end of one of primary spokes 3 (or one of secondary spokes 4). Suspension assembly 5 further includes suspension spring 53 positioned between sliding frame 94 and second frame 93. In one embodiment, suspension spring 53 is a compression spring configured to bias sliding frame 94 in an upward direction (toward first frame 92).

FIG. 18A shows suspension assembly 5 in the locked and non-flexible position. Secondary tension cord 47 threads around the suspension pulley 54 on sliding frame 94 and is mounted to connection point 55 on first frame 92. When secondary tension cord 47 has a maximum amount of tension, first frame 92 and sliding frame 94 are in contact. In the locked position, suspension spring 53 is not able to compress and the wheel 1 will remain in a firm state as it rolls. When the tension on secondary tension cord 47 is decreased, so that it develops slack, the suspension spring 53 will then be able to be compressed. FIG. 18B shows suspension assembly 5 with suspension spring 53 compressed and first frame 92, second frame 93, and central rod 91 displaced in the direction of the upward arrow. In this view, secondary tension cord 47 is set to have the maximum amount of slack. This allows the distance between connection point 55 and suspension pulley 54 to widen as suspension spring 53 compresses. This compression is the result of the upward normal force on the tread from the ground. The tread of wheel 1 is attached to tread mount point 57 on second frame 93 of suspension assembly 5. In an alternate embodiment, multiple secondary tension cords 47 may be used to engage rubber stoppers at various heights to prevent to suspension spring 53 from compressing further at the selected heights.

Figure 16C:
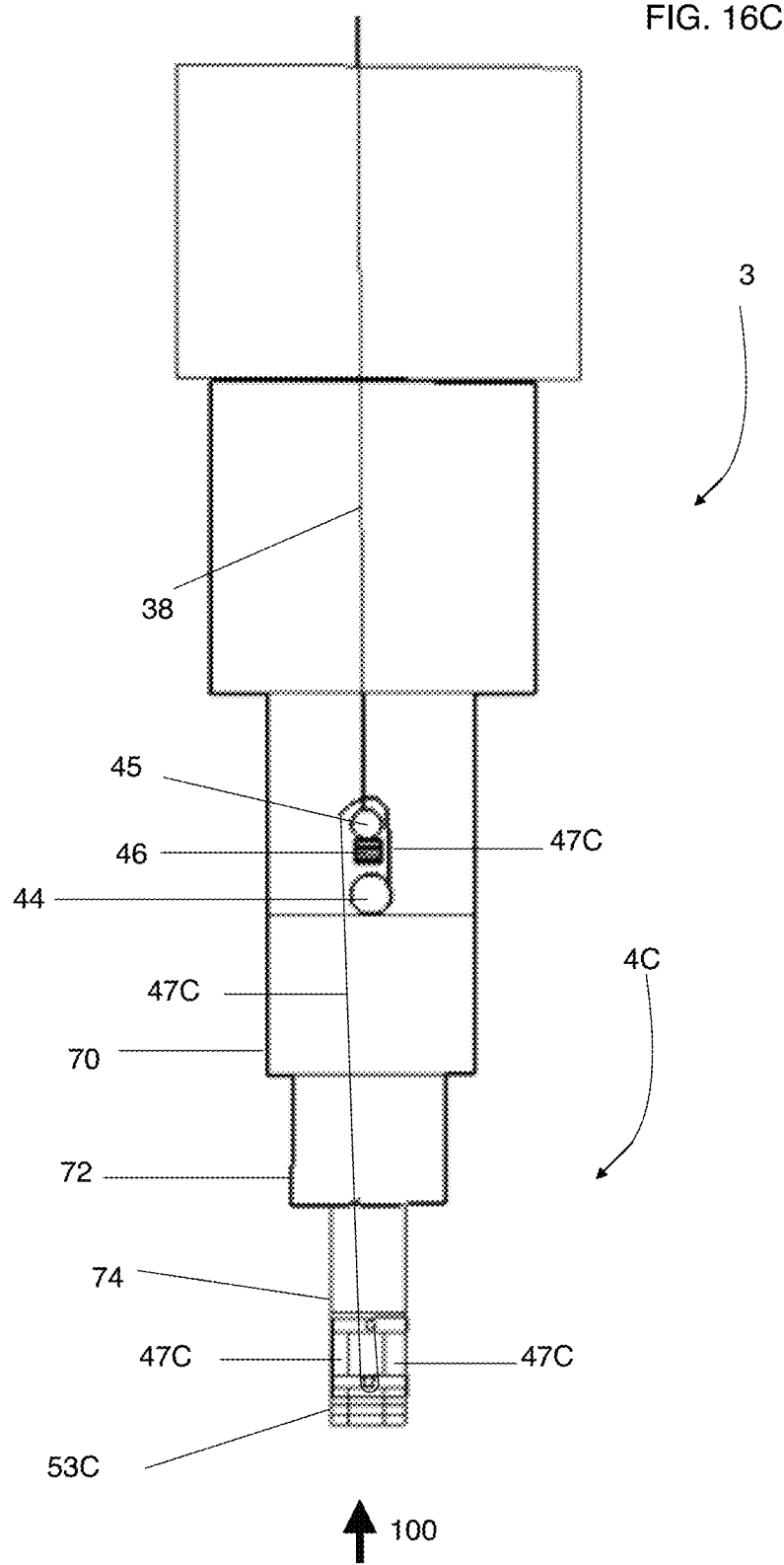
FIG. 16C a schematic view of the tension cords in the primary spoke and the secondary spoke, with the suspension assembly in a compressed position.

The details of the adjustment of one suspension assembly 5C with the firmness cord system is shown in FIGS. 16A-16C. FIG. 16A schematically illustrates suspension assembly 5C in the locked position (highest tread firmness setting). When tensioner wheel 20 is rotated relative to hub housing 9 of central hub assembly 2 in a direction that increases the length of primary tension cord 38 extending beyond hub housing 9, tension pulley 45 travels in direction 102 due to its connection to primary tension cord 38 and the force of tension spring 46 in direction 102. The movement of tension pulley 45 in direction 102 allows slack in secondary tension cord 47C in the flexible position shown in FIG. 16B. In the flexible position, however, suspension spring 53C is not compressed unless and until a force in direction 100 is applied to suspension assembly 5C. When a force in direction 100 is applied to suspension assembly 5C, suspension spring 53C is compressed to place suspension assembly in the compressed position shown in FIG. 16C. In certain embodiments, secondary tension cord 47C may have not be taut even when suspension spring 53C is compressed. For example, if primary tension cord 38 is set to its minimum tension, secondary tension cord 47C may have slack even when suspension spring 53C is compressed in the compressed position.

Figure 19A:
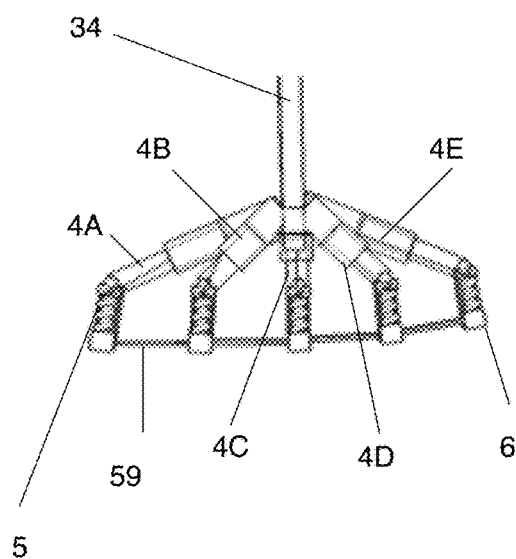
FIG. 19A is a front view an outer section of the wheel with the suspension assemblies in the locked position.

FIG. 19A shows secondary spokes 4A, 4B, 4C, 4D, 4E with the associated suspension assemblies 5 in the locked position (i.e., the non-flexible state). As shown, suspension assemblies 5 are connected to the outer ends of each of secondary spokes 4A, 4B, 4C, 4D, 4E. Treads 6 are attached to the outer ends of each of suspension assemblies 5. Treads 6 may be formed of plastic, rubber, or any other material that offers flexibility or reduces noise as wheel 1 rolls. Each tread 6 may have a width between 0.5 inches and 24 inches, or any subrange therein. Optionally, tread fillers 59 may be mounted between adjacent treads 6. Tread fillers 59 provide improved traction for wheel 1 and prevent external material from being wedged between adjacent treads 6. Tread fillers 59 may be formed of a netting material, plastic rods, or rubber.

Figure 19B:
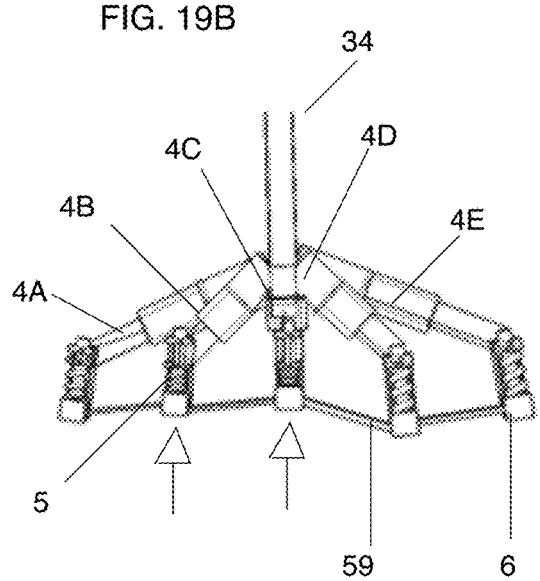
FIG. 19B is a front view of the outer section of the wheel with the suspension assemblies in the flexible position and the compressed position.

In FIG. 19B, two suspension assemblies 5 are in the compressed position. At the location where suspension assembly 5 is compressed, tread filler 59 has lengthened and the angle between tread filler 59 and tread 6 has changed. To accommodate the flexibility of wheel 1, tread filler 59 must be configured for size (length) adjustment to cover the gap between adjacent treads 6 and for adjustment of the angle between treads 6 and tread fillers 59. In this embodiment, tread filler 59 may be formed of rods with ends (not shown) mounted inside of treads 6. The rods are long enough to accommodate the increased distance and the change in the angle formed when one of the suspension assemblies 5 compresses while the adjacent suspension assemblies 5 remain uncompressed. The excess lengths of the rods are stored in treads 6 when wheel 1 is fully extended and locked in a non-flexible position. The angle of the rods with treads 6 is configured to change by leaving a gap of sufficient width at the point where excess lengths of the rods enter treads 6.

Figure 20A:
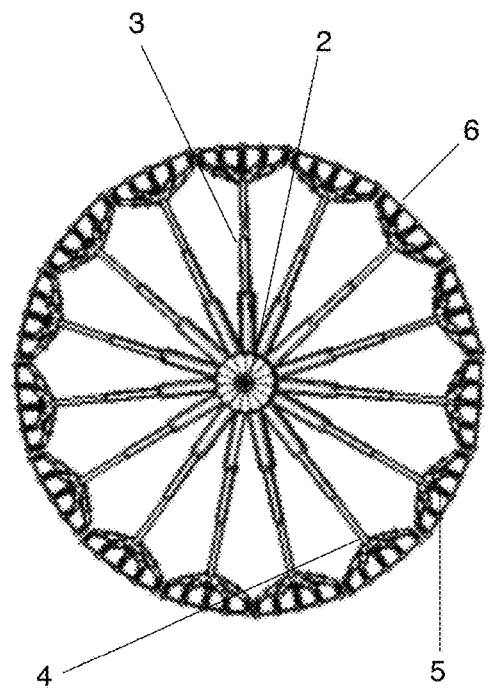
FIG. 20A is a front view of the wheel in a fully extended position.
Figure 20B:
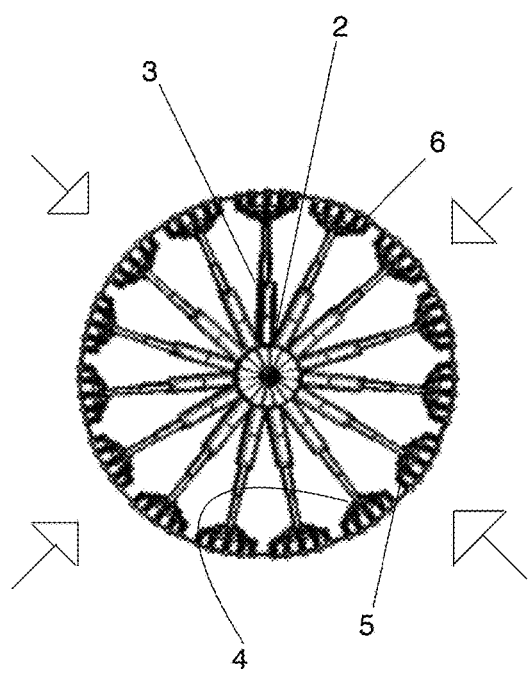
FIG. 20B is a front view of the wheel in a reduced radius position.

When the radius of the wheel 1 shrinks, the excess portion of tread filler 59 must be pushed further into treads 6 to accommodate the smaller circumference of wheel 1. FIG. 20A shows wheel 1 in the maximum radius setting. This is similar to the position of wheel 1 in FIG. 1. FIG. 20B shows wheel 1 in a reduced radius position. The arrows indicate the direction of the change. The length of primary spokes 3 and secondary spokes 4 in FIG. 20B are smaller than the same components in FIG. 20A. This length reduction causes the gap between adjacent suspension assemblies 5 to shrink and requires storage of the excess portion of tread fillers 59. Depending on the maximum radius of wheel 1, the excess portion of tread fillers 59 may be longer than treads 6. In this case, tread fillers 59 may extend past the opposite end of treads 6. In this embodiment, excess portions of tread fillers 59 must not contact the ground when the radius is set to the smallest setting and suspension assemblies 5 are compressed. In other embodiments, tread fillers 59 change size by passively telescoping. In still other embodiments, tread fillers 59 are formed with other materials such as netting, wire, or springs.

The radius and/or the tread firmness of wheel 1 may be adjusted while wheel 1 bears a load, such as from a carriage to which wheel 1 is attached. Tensioner lock 17 and radius lock 18 assist in adjusting these settings while under a load. Expander cords also assist in adjusting the radius setting while wheel 1 is under a load. These expander cords include primary spoke expander 10 and internal spoke expander 61 for expanding primary spokes 3 under a load, along with secondary wheel expander 12, secondary spoke expander 48, and secondary internal expander 66 for expanding secondary spokes 4 under a load.

The primary spokes may be attached to the central hub assembly by inserting an inner end of each primary spoke through a reciprocally shaped opening in the hub housing of the central hub assembly. Alternatively, one or more components of central hub assembly may extend around the primary spokes to secure the primary spokes to the central hub assembly. In another embodiment, a subset of the primary spokes are secured to the central hub assembly, and the remainder of the primary spokes are secured to adjacent primary spokes. In most embodiments, the hub housing of the central hub assembly includes openings to allow the various cords to slide between the central hub assembly and the primary spokes.

Each of secondary spokes 4 may be secured to the outer end of the associated primary spoke 3 with brackets, bolts, screws, by welding, or any other durable securing mechanism.

Each of the cords described herein may be secured to the described components of wheel 1 by providing an opening in the component and placing a knot on the opposite end of the component. Alternatively, the end of each cord may be glued, taped, or screwed to the corresponding component of wheel 1.

Secondary wheel 44 and each of the pulleys described may be secured to the corresponding segment of the primary spoke 3 or second spoke 4 with an axel mounted to opposing surfaces within the inner cavity of the segment. Each of the pulleys described herein may be configured to rotate or remain stationary such that adjustment in the cords either rotates the pulley or causes the cord to slide over the pulley's surface.

In certain embodiments of central hub assembly 2, hub housing 9, radius wheel 19, and tensioner wheel 20 are each formed of a material of sufficient durability to withstand wear by tensioner lock 17 and radius lock 18. In another embodiment, a bearing (e.g., a small ball) is secured to the outer end of each tensioner lock 17 and radius lock 18 to reduce friction between the locks and hub housing 9, radius wheel 19, and tensioner wheel 20 during relative rotation of internal components of central hub assembly 2.

Figure 21:
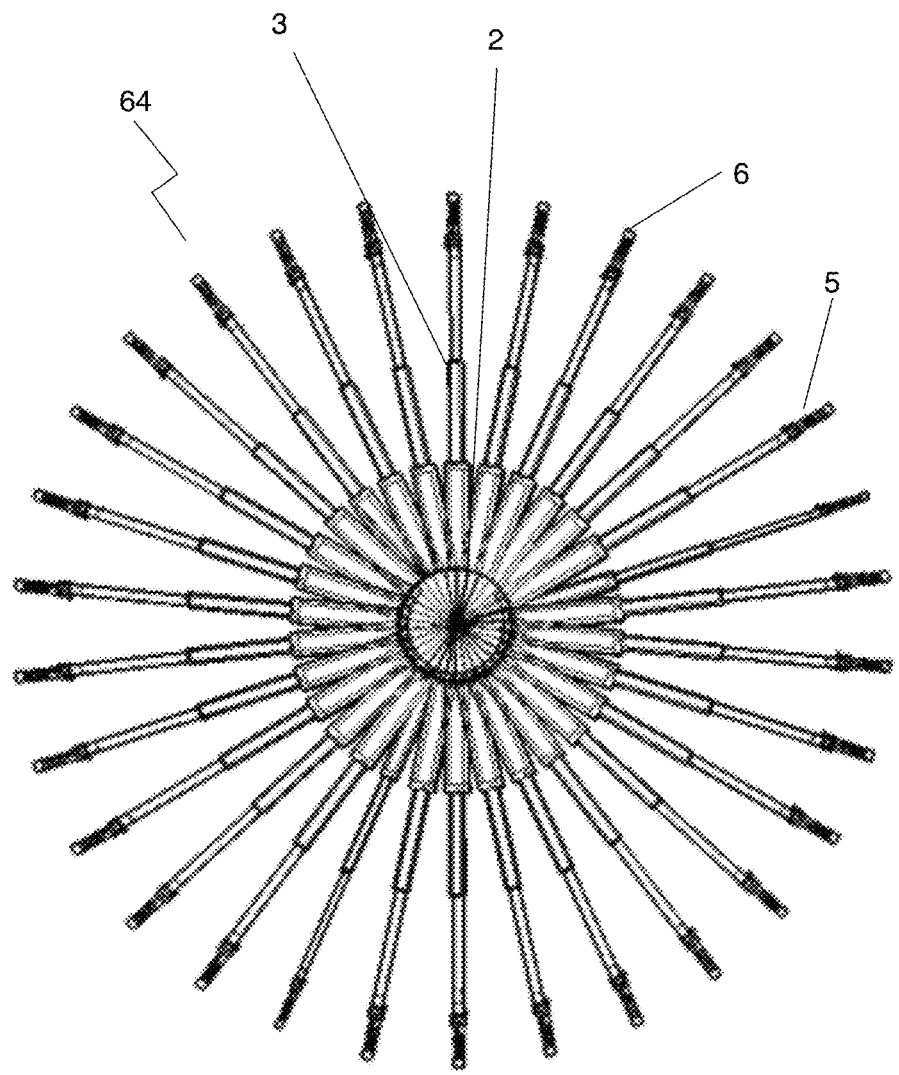
FIG. 21 is a schematic front view of an alternate embodiment of the variable wheel with adjustable radius and tread firmness.

There are many other embodiments of the adjustable wheel disclosed herein. The number of secondary spoke 4 may vary. Alternatively, secondary spokes 4 may be eliminated to simplify the wheel or to adjust the smoothness of the ride. For example, FIG. 21 illustrates alternate wheel 64 including central hub assembly 2, primary spokes 3, suspension assemblies 5, and treads 6. Alternate wheel 64 does not include secondary spokes 4 or tread fillers 59. Alternate wheel 64 has a reduced complexity and can handle different loads, but may have a rougher ride due to fewer contact points with the ground. In another embodiment of the adjustable wheel, suspension assemblies 5 and the controlling components may be eliminated to create a wheel with an adjustable radius but without an adjustable tread firmness. In another embodiment, the adjustable wheel has a fixed radius but an adjustable tread firmness. This wheel does not include the internal components associated with changing the lengths of primary spokes 3 and secondary spokes 4, but does include the components associated with suspension assemblies 5. Many other embodiments exist to accommodate other user requirements, such as different techniques for telescoping the spokes and controlling the tensions of the treads.

While preferred embodiments of the present disclosure have been described, it is to be understood that the embodiments described are illustrative only and that the scope of the disclosure is to be defined solely by the appended claims when accorded a full range of equivalents, many variations and modifications naturally occurring to those skilled in the art from a perusal hereof.

I claim:

1. A wheel with adjustable radius and tread firmness, comprising:
    a hub assembly including a hub housing with an outer surface and an inner bore, a radius wheel with an inner bore and disposed within the inner bore of the hub housing, and a tensioner wheel disposed at least partially within the inner bore of the radius wheel;
    a plurality of primary spokes each including a first segment and a second segment, wherein the first segment of each of the primary spokes is attached to the outer surface of the hub housing and the second segment is slidingly connected to the first segment;
    a plurality of suspension assemblies each operatively connected to an outer end of one of the primary spokes;
    a plurality of treads each attached to an outer end of one of the suspension assemblies;
    a radius cord system for extending and contracting each of the primary spokes simultaneously and uniformly to increase or decrease a wheel radius under a load, wherein the radius cord system includes a plurality of expansion cords and a plurality of contraction cords, wherein each of the expansion cords and each of the contraction cords extends from the radius wheel in the hub assembly to one of the primary spokes, wherein each of the expansion cords engages an expansion pulley in the primary spoke; and
    a firmness cord system for increasing and decreasing a wheel tread firmness under a load, wherein the firmness cord system includes a plurality of tension cord sets, wherein each tension cord set includes one or more tension cords extending from the tensioner wheel in the hub assembly, through one of the primary spokes, and to one of the suspension assemblies, wherein each of the tension cord sets engages a suspension pulley in the suspension assembly.

2. The wheel of claim 1, wherein the hub assembly further includes a radius lock attached to the radius wheel and selectively engaging the hub housing; wherein in a locked position the radius lock engages the hub housing to prevent relative rotation between the radius wheel and the hub housing; wherein in an unlocked position the radius lock disengages the hub housing to allow relative rotation between the radius wheel and the hub housing when the wheel is rotated.

3. The wheel of claim 2, wherein with the radius lock in the unlocked position relative rotation between the radius wheel and the hub housing in a first direction applies tension to each of the contraction cords to contract each of the primary spokes and to decrease the wheel radius; wherein with the radius lock in the unlocked position relative rotation between the radius wheel and the hub housing in a second direction applies tension to each of the expansion cords to expand each of the primary spokes and to increase the wheel radius.

4. The wheel of claim 3, wherein the hub assembly further includes a tensioner lock attached to the tensioner wheel and selectively engaging the radius wheel; wherein in a locked position the tensioner lock engages the radius wheel to prevent relative rotation between the tensioner wheel and the radius wheel; wherein in an unlocked position the tensioner lock disengages the radius wheel to allow relative rotation between the tensioner wheel and the radius wheel when the wheel is rotated.

5. The wheel of claim 4, wherein with the tensioner lock in the unlocked position relative rotation between the tensioner wheel and the radius wheel in a first direction increases tension on each of the tension cord sets to increase the wheel tread firmness; wherein with the tensioner lock in the unlocked position relative rotation between the tensioner wheel and the radius wheel in a second direction decreases tension on each of the tension cord sets to decrease the wheel tread firmness.

6. The wheel of claim 5, wherein the hub assembly further includes a central sleeve disposed partially within an inner bore of the tensioner wheel; wherein the central sleeve is rotationally locked to the tensioner wheel; and wherein when the radius lock and the tensioner lock are both in the locked position the central sleeve, the tensioner wheel, the radius wheel, and the hub housing rotate together.

7. The wheel of claim 6, wherein each of the contraction cords is attached to an inner end of the second segment of one of the primary spokes for pulling the second segments into the first segments when tension is applied to the contraction cords; wherein each of the expansion pulleys is disposed at an outer end of the first segment of one of the primary spokes;
  wherein each of the expansion cords extends around the expansion pulley of one of the primary spokes and is attached to the inner end of the second segments for extending the second segments from the first segments when tension is applied to the expansion cords.

8. The wheel of claim 6, wherein each of the primary spokes further includes a third segment slidingly connected to the second segment; wherein each of the suspension assemblies is attached to an outer end of the third segment of one of the primary spokes; wherein each of the contraction cords is attached to an inner end of the third segment of one of the primary spokes for pulling the third segments into the second segments when tension is applied to the contraction cords; wherein each of the expansion pulleys is disposed at an outer end of the second segment of one of the primary spokes; wherein each of the expansion cords extends around the expansion pulley of one of the primary spokes and is attached to the inner end of the third segment for extending the third segments from the second segments when tension is applied to the expansion cords.

9. The wheel of claim 8, wherein the radius cord system further includes a plurality of internal expansion cords and a plurality of internal contraction cords each positioned within one of the primary spokes; wherein each of the internal contraction cords is attached to the inner end of the third segment, extends around a first contraction pulley positioned at the outer end of the second segment and around a second contraction pulley positioned at an inner end of the first segment, and is attached to an inner end of the second segment of one of the primary spokes for pulling the second segments into the first segments when the third segments are pulled into the second segments; wherein each of the internal expansion cords is attached to the inner end of the third segment, extends around an internal expansion pulley positioned at the inner end of the second segment, and is attached to an outer end of the first segment of one of the primary spokes for extending the second segments from the first segments when the third segments are extended from the second segments.

10. The wheel of claim 6, further comprising a plurality of secondary spokes each including a first segment and a second segment; wherein the first segment of each of the secondary spokes is attached to the outer end of one of the primary spokes; wherein two or more secondary spokes are attached to each of the primary spokes; wherein each of the suspension assemblies is attached to an outer end of one of the secondary spokes; wherein each of the primary spokes further includes a secondary wheel disposed near adjacent the outer end of the primary spoke, with each of the secondary wheels configured to rotate within the primary spoke.

11. The wheel of claim 10, wherein the radius cord system further includes a plurality of secondary wheel expansion cords, a plurality of secondary wheel contraction cords, a plurality of secondary expansion cords, and a plurality of secondary contraction cords; wherein each of the secondary wheel contraction cords extends from the radius wheel in the hub assembly to the secondary wheel in one of the primary spokes; wherein each of the secondary wheel expansion cords extends from the first segment of each of the primary spokes to the secondary wheel in the second segment of the primary spoke; wherein each of the secondary expansion cords and each of the secondary contraction cords extends from the secondary wheel in one of the primary spokes to one of the secondary spokes; wherein each of the secondary expansion cords engages a secondary expansion pulley in the secondary spoke.

12. The wheel of claim 11, wherein the secondary expansion cord and the secondary contraction cord for a first secondary spoke is attached to a first portion of the secondary wheel; wherein the secondary expansion cord and the secondary contraction cord for a second secondary spoke is attached to a second portion of the secondary wheel; wherein the first portion and the second portion have different diameters.

13. The wheel of claim 11, wherein relative rotation between the radius wheel and the hub housing in the first direction also applies tension to each of the secondary wheel contraction cords to rotate each of the secondary wheels in a contraction direction, which applies tension to each of the secondary contraction cords and contracts each of the secondary spokes; wherein relative rotation between the radius wheel and the hub housing in the second direction also applies tension to each of the secondary wheel expansion cords to rotate each of the secondary wheels in an expansion direction, which applies tension to each of the secondary expansion cords and expands each of the secondary spokes.

14. The wheel of claim 10, wherein each of the suspension assemblies includes an inner frame and an outer frame each affixed to a guide, a sliding frame slidingly engaging the guide between the inner frame and the outer frame, and a suspension spring biasing the sliding frame toward the inner frame; wherein the suspension pulley is attached to the sliding frame for pulling the sliding frame toward the inner frame when the tension is increased on each of the tension cord sets.

15. The wheel of claim 14, wherein each of the tension cord sets further includes a first tension cord and a second tension cord; wherein each of the first tension cords is attached to the tensioner wheel in the hub assembly, extends through one of the primary spokes, and is attached to a tension pulley slidingly disposed within the primary spoke;

wherein each of the second tension cords is attached to the secondary wheel in one of the primary spokes, extends around the tension pulley, extends through one of the secondary spokes, extends around the suspension pulley, and is attached to the inner surface of the suspension assembly; wherein the tension pulley is biased toward the outer end of the primary spoke by a tensioner spring.

16. A wheel with adjustable radius, comprising:
    a hub assembly including a hub housing with an outer surface and an inner bore, and a radius wheel disposed within the inner bore of the hub housing;
    a plurality of primary spokes each including a first segment and a second segment, wherein the first segment of each of the primary spokes is attached to the outer surface of the hub housing and the second segment is slidingly connected to the first segment; and
    a radius cord system for extending and contracting each of the primary spokes simultaneously and uniformly to increase or decrease a wheel radius under a load, wherein the radius cord system includes a plurality of expansion cords and a plurality of contraction cords, wherein each of the expansion cords and each of the contraction cords extends from the radius wheel in the hub assembly to one of the primary spokes, wherein each of the expansion cords engages an expansion pulley in the primary spoke.

17. The wheel of claim 16, wherein the hub assembly further includes a radius lock attached to the radius wheel and selectively engaging the hub housing; wherein in a locked position the radius lock engages the hub housing to prevent relative rotation between the radius wheel and the hub housing; wherein in an unlocked position the radius lock disengages the hub housing to allow relative rotation between the radius wheel and the hub housing when the wheel is rotated; wherein with the radius lock in the unlocked position relative rotation between the radius wheel and the hub housing in a first direction applies tension to each of the contraction cords to contract each of the primary spokes and to decrease the wheel radius; wherein with the radius lock in the unlocked position relative rotation between the radius wheel and the hub housing in a second direction applies tension to each of the expansion cords to expand each of the primary spokes and to increase the wheel radius.

18. The wheel of claim 17, further comprising a plurality of secondary spokes each including a first segment and a second segment; wherein the first segment of each of the secondary spokes is attached to the outer end of one of the primary spokes; wherein two or more secondary spokes are attached to each of the primary spokes; wherein each of the suspension assemblies is attached to an outer end of one of the secondary spokes; wherein each of the primary spokes further includes a secondary wheel disposed near adjacent the outer end of the primary spoke, with each of the secondary wheels configured to rotate within the primary spoke.

19. The wheel of claim 18, wherein the radius cord system further includes a plurality of secondary wheel expansion cords, a plurality of secondary wheel contraction cords, a plurality of secondary expansion cords, and a plurality of secondary contraction cords; wherein each of the secondary wheel expansion cords and each of the secondary wheel contraction cords extends from the radius wheel in the hub assembly to the secondary wheel in one of the primary spokes; wherein each of the secondary expansion cords and each of the secondary contraction cords extends from the secondary wheel in one of the primary spokes to one of the secondary spokes; wherein each of the secondary expansion cords engages a secondary expansion pulley in the secondary spoke.

20. A wheel with adjustable tread firmness, comprising:
    a hub assembly including a hub housing with an outer surface and an inner bore, and a tensioner wheel disposed at least partially within the inner bore of the hub housing;
    a plurality of primary spokes attached to the outer surface of the hub housing;
    a plurality of suspension assemblies each operatively connected to an outer end of one of the primary spokes, wherein each of the suspension assemblies includes an inner frame and an outer frame each affixed to a guide, a sliding frame slidingly engaging the guide between the inner frame and the outer frame, and a suspension spring biasing the sliding frame toward the inner frame, wherein a suspension pulley is attached to the sliding frame;
    a plurality of treads each attached to an outer end of one of the suspension assemblies; and
    a firmness cord system for increasing and decreasing a wheel tread firmness under a load, wherein the firmness cord system includes a plurality of tension cord sets, wherein each tension cord set includes one or more tension cords extending from the tensioner wheel in the hub assembly, through one of the primary spokes, and to one of the suspension assemblies, wherein each of the tension cord sets engages the suspension pulley in the suspension assembly for pulling the sliding plate toward the inner surface when a tension is increased on each of the tension cords.

21. The wheel of claim 20, wherein the hub assembly further includes a tensioner lock attached to the tensioner wheel and selectively engaging the hub housing; wherein in a locked position the tensioner lock engages the hub housing to prevent relative rotation between the tensioner wheel and the hub housing; wherein in an unlocked position the tensioner lock disengages the hub housing to allow relative rotation between the tensioner wheel and the hub housing when the wheel is rotated; wherein with the tensioner lock in the unlocked position relative rotation between the tensioner wheel and the hub housing in a first direction increases tension on each of the tension cord sets to increase the wheel tread firmness; wherein with the tensioner lock in the unlocked position relative rotation between the tensioner wheel and the hub housing in a second direction decreases tension on each of the tension cord sets to decrease the wheel tread firmness.

* * * * *